United States Patent
Bailey et al.

(10) Patent No.: US 11,582,216 B2
(45) Date of Patent: *Feb. 14, 2023

(54) LEARNED ROVING AUTHENTICATION PROFILES

(71) Applicant: Microsoft Technology Licensing, LLC, Redmond, WA (US)

(72) Inventors: Guillaume Bailey, Kirkland, WA (US); Kshitij Mahendru, Bellevue, WA (US); Jun Wu, Issaquah, WA (US); Vlado Zaric, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/988,950

(22) Filed: May 24, 2018

(65) Prior Publication Data

US 2018/0351932 A1 Dec. 6, 2018

Related U.S. Application Data

(63) Continuation of application No. 14/748,031, filed on Jun. 23, 2015, now Pat. No. 10,009,329.

(51) Int. Cl.
*H04W 12/06* (2021.01)
*H04L 9/40* (2022.01)
(Continued)

(52) U.S. Cl.
CPC ............ *H04L 63/08* (2013.01); *H04L 63/102* (2013.01); *H04L 63/205* (2013.01); *H04W 12/06* (2013.01);
(Continued)

(58) Field of Classification Search
None
See application file for complete search history.

(56) References Cited

U.S. PATENT DOCUMENTS

| | | | | |
|---|---|---|---|---|
| 2013/0263234 A1* | 10/2013 | Givoni | ................... | H04L 63/10 726/5 |
| 2014/0080450 A1* | 3/2014 | Gupta | ................... | H04W 76/10 455/411 |

FOREIGN PATENT DOCUMENTS

| | | |
|---|---|---|
| CN | 101005399 A | 7/2007 |
| CN | 101009608 A | 8/2007 |

(Continued)

OTHER PUBLICATIONS

"Office Action Issued in European Patent Application No. 16732869. 9", dated Feb. 3, 2020, 5 Pages.

(Continued)

*Primary Examiner* — Fatoumata Traore
(74) *Attorney, Agent, or Firm* — Newport IP, LLC; Jacob P. Rohwer

(57) ABSTRACT

Disclosed herein are systems and methods for determining learned associations between authentication credentials and network contextual data, such as may be utilized in a network that supports network roving. A mobile device attempts to rove to a visited network using authentication credentials associated with another network, based at least in part on first contextual information associated with the other network and second contextual information associated with the visited network indicating that the visited network is part of a common association of networks that supports roving internetworking between the networks of the common association.

17 Claims, 9 Drawing Sheets

(51) Int. Cl.
  *H04W 12/63* (2021.01)
  *H04W 12/67* (2021.01)
(52) U.S. Cl.
  CPC ....... *H04L 2463/082* (2013.01); *H04W 12/63* (2021.01); *H04W 12/67* (2021.01)

(56) References Cited

FOREIGN PATENT DOCUMENTS

| CN | 101919278 A | 12/2010 |
| CN | 101919278 B | 9/2013 |

OTHER PUBLICATIONS

"First Office Action and Search Report Issued in Chinese Patent Application No. 201680037315 0", dated Mar. 4, 2020, 13 Pages.

* cited by examiner

LEARNED ROVING AUTHENTICATION PROFILES

PRIORITY APPLICATION

This application is a continuation application of and claims priority to U.S. patent application Ser. No. 14/748,031, entitled "Learned Roving Authentication Profiles," filed on Jun. 23, 2015, the disclosure of which is incorporated herein by reference in its entirety.

BACKGROUND

A static profile is stored on a mobile station in order for the mobile station to automatically authenticate to a network. The profile information includes the network associations and authentication credentials that can be used to authenticate to a network that participates in a network associations. The static profile can be manually loaded, loaded by a manufacturer of the mobile station as part of an initial build, automatically pushed to the mobile station, and so forth. Without a profile on the mobile station, the mobile station may not automatically connect using those credentials, leaving the user to manually authenticate to the network, if at all, thereby potentially remaining connected to a cellular service for network connectivity or having no connectivity at all.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present disclosure learn and utilize implicit or learned profiles to authenticate to a visited network that is part of an association of networks, such as where a static roving authentication profile for the association is not available on the mobile station. The mobile station successfully authenticates to a wireless network via an access point that advertises information indicating that the access point is part of an association of networks. The learned profile includes the successful authentication credentials as well as contextual information, including the advertised network association information, location information, out-of-band networks present, sensor data, and so forth. At a later time, the mobile station encounters another wireless network access point that advertises network association information for which it does not have a static authentication profile (either a roving profile or a profile specific to the visited network). The mobile station attempts to authenticate to the access point using the learned or implicit profile, including using the previously successful authentication credentials. Based on the success or failure of the attempted authentication using the implicit profile, the learned profile may be modified, or another learned profile may be created, with the result being a learned profile that is more specific.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
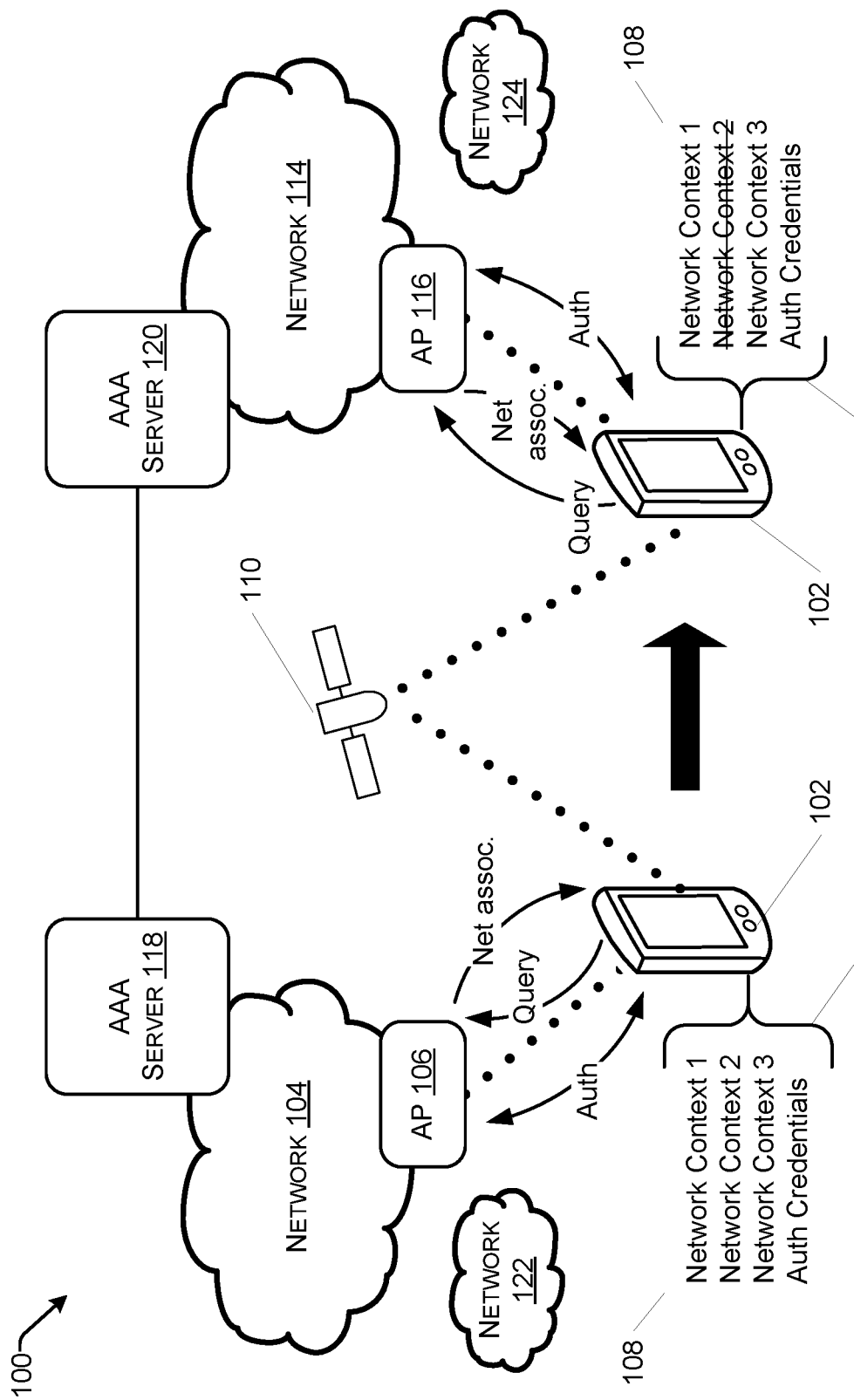
FIG. 1 illustrates an example environment for learning a roving authentication profile.

A user may have various authentication credentials associated with different entities, such as employers, universities, service providers (such as internet providers, mobile carriers, club memberships), and so on that would enable the user to authenticate to a mobile hotspot. Because utilizing a cellular network often requires more power, and is often more expensive, than using wireless local area networks (WLANs), failure to authenticate to a WLAN or other network represents a lost chance to improve battery and power usage, and a lost opportunity to preserve limited cellular bandwidth.

Embodiments of the present disclosure learn and utilize implicit or learned profiles to authenticate to a visited network that is part of an association of networks, even where a static roving authentication profile for the association is not available on the mobile station. The "mobile station" may include any network-enabled device including but not limited to a desktop computer, a laptop computer, a mobile phone, a personal data assistant (PDA), a tablet computer, a game console, an electronic book reader device, a media player, a streaming media console, a network-enabled appliance, a wearable device such as a smart watch, activity tracker, network-enabled clothing, and so forth. In an initial learning phase, the mobile station may successfully authenticate to a wireless network via an access point that advertises information indicating that the access point is part of an association of networks. The successful authentication may be based on conventional authentication, such as through a static profile, manually entered authentication information, a captive portal authentication technique, or other. A learned profile is generated or modified that associates the authentication credentials with network context information, such as network association information. In some embodiments, a learned profile may be generated from a static profile, such as by extracting network contextual information from it, such as keywords or other information and creating a more general learned profile that can be used to attempt to authenticate to another network. The learned profile or profiles get stored, and include the authentication credentials as well as contextual information, including the advertised network association information, location information, out-of-band networks present, sensor data, and so forth.

At a later time, the mobile station encounters another wireless network that advertises network association information for which the mobile station does not have access to static credentials (either roving credentials or credentials specific to the visited network) that are indicated as definitely usable to authenticate to the wireless network. The mobile station attempts to authenticate to the access point using the learned or implicit profile, including using the previously successful authentication credentials. The learned or implicit profile may be used to attempt to authenticate where the learned or implicit profile includes contextual information, such as network association information, location information, or other information, that matches, correlates to, agrees with, or corresponds to the contextual information associated with the visited network to at least some extent, such as network association information being advertised by the visited network.

Based on the success or failure of the attempted authentication using the learned profile, the learned profile may be modified, or another learned profile may be created, with the result being a learned profile that is more specific. For example, where the initial authentication that resulted in the learned profile being created was to a network that advertised three network associations, the learned profile will initially store the three network associations. If the later successful authentication using the learned profile was to another access point that advertised two of the three network associations in common with the learned profile, then the network association not in common may be eliminated from the learned profile. In some embodiments, a new learned profile that includes only the two common network associations may be created, and the more general profile retained. Where the authentication is unsuccessful, the common network associations may be eliminated from the learned authentication profile, or a new profile without the common network associations created and the more general profile retained.

Embodiments also include various schemes for prioritizing profiles, both static and learned, such as based on levels of specificity of the profiles, by collecting statistics on successful authentications, and using fuzzy logic to prioritize profiles. Embodiments also include various profile learning schemes such as waiting until a certain number of successful (or unsuccessful) authentications prior to modifying or narrowing a profile, or prior to creating a new profile. Embodiments may also mark a learned authentication profile as a persisted profile, in order to prevent it from being deleted or changed once it has been successfully used to authenticate a certain number of times, or based on other factors. Embodiments also include cloud-based schemes that attempt to determine contextual characteristics of learned profiles that are likely to result in successful authentication attempts in various contexts. One example includes determining that learned authentication profiles having certain network association information (e.g., network associations for mobile carriers) stored therein have a high probability of being successfully used to authenticate to a visited network when the mobile station is in certain locations (e.g., when the device is in a location inferred to be a retail location of a large retail chain).

The devices, processes, and systems described herein can be implemented in a number of ways. Embodiments described below are with respect to IEEE 802.11 family of technical standards, and in particular to the 802.11u amendments to those standards that enable capability discovery, and the Wi-Fi Alliance "Wi-Fi Certified Passpoint," also known as "Hotspot 2.0," which allows roving access to Wi-Fi networks. But embodiments of the present disclosure may be utilized with other types of roving-enabled networks other types of network metadata, network metadata protocols, or methods for inferring network metadata (such as by using network context information) in the absence of a protocol.

The IEEE 802.11 specifications define media access control (MAC) and physical layer specifications for wireless local area networking (WLAN), and is often referred to as Wi-Fi. The IEEE 802.11u specification and the related Wi-Fi Alliance Hotspot 2.0 (HS20) specification together provide automatic discoverability and connection to a Wi-Fi hotspot. In particular, an 802.11u compliant access point (AP) broadcasts network association information, enabling devices to discover not just the AP itself, but also those network associations whose security credentials can be used to connect to the network serviced by the AP. In conventional 802.11, an AP broadcasts a service set identifier (SSID), which all APs in an 802.11 network share. To connect to an 802.11 network, a user device utilizes authentication credentials specific to the network identified by the SSID.

With 802.11u, an AP advertises that it belongs to a network association, such as by advertising a homogenous extended service set identifier (HESSID), roaming consortium information, or other information. An 802.11u compliant mobile station may use authentication credentials associated with the network association to authenticate to the network serviced by the AP. Thus, the mobile station need not have authentication credentials specific to the network and the SSID of the AP in order to successfully connect to the network through the AP.

Embodiments of the present disclosure describe "roving" between networks. As used herein, roving or "roving internetworking" and similar terms and phrases refers to the processes and capabilities of devices, such as wireless devices, to use an authentication mechanism, including use of one or more authentication credentials, associated with a first network (e.g., a home network) to connect to a second network (e.g., a visited network). In a roving scenario, the second network accepts authentication credentials associated with the first network (or with a network association generally) to enable access to the second network, based on an internetworking arrangement involving the first network and the second network that enables devices associated with the first network to connect to the second network.

Embodiments of the present disclosure include learned and static authentication profiles. A static authentication profile includes authentication profiles with network contextual information (e.g., SSID, HESSID, etc.) and associated authentication credentials, in which the authentication credentials are indicated in some way as being definitely usable to authenticate to networks that match the network contextual information. Learned authentication profiles include authentication profiles with network contextual information and associated authentication credentials, in which the authentication credentials are not indicated as being definitely usable to authenticate to networks that match the network contextual information. Thus, a static authentication profile may be assumed to work with all networks having contextual information that match the contextual information of the profile, while a learned profile is not assumed to work with all networks having contextual information that match the contextual information of the profile. As such, in one embodiment, a static profile may be preferred or prioritized over a learned profile where both match network contextual information associated with a visited network.

Also, the use of the terms static and learned are not meant to imply that a static authentication profile cannot be determined, created, or altered (such as when authentication credentials change or first become known), or that a learned authentication profile cannot be persisted, write-protected, or otherwise prevented from being altered. These terms are used for the sake of description only.

Also, although some authentication credentials may be described herein as being indicated as definitely usable to authenticate to a network, this is not meant to imply that such authentication credentials are actually usable to authenticate to the network, only that they are indicated as definitely usable to authenticate, and therefore may be generally preferred over other authentication credentials that are not indicated as definitely usable and/or that are indicated as being indefinitely or uncertainly usable to authenticate to a network. Also, authentication credentials may be stored in a static authentication profile and indicated as definitely usable to authenticate to a first set of networks that match the associated network contextual information of the static authentication profile, while the same authentication credentials are stored in another, learned authentication profile in which they are not indicated as definitely usable and/or indicated as being indefinitely or uncertainly usable to authenticate to a network that match the associated network contextual information of the static authentication profile. Embodiments may determine a learned profile based on a static profile, such as by extracting the authentication credentials and keywords or other information from the static profile and adding the authentication credentials and generating network contextual information from the extracted keywords or other information to form a learned profile.

By automatically attempting to rove to visited networks, such as by utilizing a learned profile along with a static profile, embodiments of the present disclosure enable the roving network coverage area for a particular device to be increased. In one example, the user of the mobile station is not manually involved in, and may remain unaware of, of the roving authentication. This increases the number of visited networks that the mobile station connects to, by reducing the number of missed opportunities to rove caused by lack of a static roving profile on the mobile station and/or by user ignorance of their being authorized to rove onto a Hotspot or other network. Further increasing the number of visited networks improves service for the mobile station, in the form of faster download and upload speeds (e.g., Wi-Fi speeds compared to cellular speeds), lower battery and power usage (e.g., because connecting to Wi-Fi networks generally requires less power than connecting to a cellular network), increased coverage in areas where cellular connections may not be available, less expensive network connections (e.g., because a cellular connection may be metered or subject to a data cap while a Wi-Fi connection is less likely to be metered or subject to a data cap), and so forth. Furthermore, embodiments may reduce network utilization in mobile networks by enabling more mobile devices to utilize local area networks such as Wi-Fi networks, thereby reducing or eliminating network congestion in mobile networks and improving service quality on mobile networks even for those mobile stations that do not implement embodiments of network roving described herein.

Example implementations are provided below with reference to the following figures.

FIG. 1 illustrates an example environment 100 for learning a roving authentication profile. A mobile station 102 at a first time or instance connects to network 104 via an access point 106. The mobile station 102 successfully authenticates to the network 104 using authentication credentials. While connected to the network 104, such as before, during, or after authenticating to the network 104, the mobile station 102 queries the access point 106 (or other component of the network 104) for capability information, including network association data. Where the network 104 is IEEE 802.11u and/or Hotspot 2.0 (HS20) compliant, the queries and associated responses may be via a Generic Advertisement Service (GAS) frames, via Access Network Query Protocol (ANQP), or other. Other networks using other protocols and standards may utilize other types of queries and responses.

The network 104 provides contextual information, such as network association information to the mobile station 102. Where the network 104 is IEEE 802.11u compliant and/or HS20 compliant, the network association information may include one or more of a homogeneous extended service set identifier (HESSID), a roaming consortium organization identifier (IO), a domain name or identifier, a network address identifier (NAI) realm list, cellular information, and an access network query protocol (ANQP) vendor-specific list. Additionally, other types of network context information besides network association information are collected. Also, network context information is collected, in some embodiments, in ways that does not rely on a protocol (such as ANQP) to determine network association information or other network context information directly or indirectly from a network. Other types of network context information may be used in some embodiments to infer network association information. Also, network context information is collected, in some embodiments, even where no authentication attempt is made to a network. Other examples are possible without departing from the scope of embodiment.

The mobile station 102 associates the authentication credentials successfully utilized to authenticate to the network 104 with contextual information 108 associated with the first network. The contextual information 108 includes, in some embodiments, the network association information obtained by querying the network 104. In some embodiments, the association of the authentication credentials with the network association information occurs after the mobile station 102 successfully authenticates to the network 104.

The authentication credentials may have been obtained through some means other than a static roving authentication profile, such as through a non-roving static authentication profile, from manually entered authentication information, from a captive portal authentication technique, or other. 802.11u and HS20, for example, anticipate that a static roving authentication profile is created by a network administrator, a mobile station manufacturer, a carrier, mobile station user, or other, and that the static roving authentication profile statically associates authentication credentials with network association information, such as HESSID, roaming consortium OIs, and so forth. When a device encounters a network that advertises its association with a matching HESSID, roaming consortium OI, or other, the device automatically roves to the network using the statically configured authentication credentials. In embodiments of the present disclosure, the association of the authentication credentials with the network association information (as well as with other contextual information) is a learned association, and not statically configured, based at least on the concurrence of the successful authentication to the network 104 using the authentication credentials and the network association information advertised or otherwise provided by the network 104. The query (such as the ANQP query) that the mobile station 102 transmits to the AP 106 is therefore not necessarily sent in order to authenticate to the network 104, but may be sent in order to obtain network association information for the purpose of dynamically associating it with the authentication credentials that were used to authenticate to the network 104.

The mobile station 102 also obtains, in some embodiments, other types of contextual information. The contextual information obtained by the mobile station may include, without limitation, sensor data, such as location data. Location data, which may be in the form of coordinates, address information, or other, may be obtained or otherwise derived from satellite-based location services, such as from a global positioning satellite (GPS) system 110. Location data may also be obtained, inferred or otherwise derived from other sensor data, such as triangulation from cellular network towers or other wireless network access points. Location data may also be obtained, inferred, or otherwise derived from the presence of out-of-band networks in the physical location of the mobile station 102 at a time that it connects to the network 104. Such out-of-band networks include, without limitation, cellular networks, Personal Area Networks (PANs; such as Bluetooth®, or other), Wi-Fi networks, television or radio broadcast networks, and so on. Other examples are possible without departing from the scope of embodiments. For example, a Bluetooth® network beacon may advertise information that is then saved as contextual information in a learned profile. The beacon information may indicate an affiliation with a retailer, mobile carrier, or other organization. Such information may be saved as network contextual information in a learned profile and used to match with network contextual information of a visited network, such as based on matching Bluetooth® beacon information of the visited network, or based on text match to other contextual information such as a match or partial match to a keyword from a captive portal web page, or match or partial match to keywords found in network association information broadcast by the visited network, and so forth. Other examples are possible without departing from the scope of embodiments. For example, a profile service may be utilized to augment network contextual information with additional information such as additional network association information, a physical location, or other roving network contextual information as discussed in more detail elsewhere within this Detailed Description.

In some embodiments, the mobile station 102 determines contextual information 108 from sensor data obtained using sensors that are communicatively coupled to the mobile station, such as wireless radios, accelerometers, GPS receivers, light sensors, microphones, pressure sensors and touch sensors (such as on a touch-screen of the mobile station 102), and so forth. Audio data, movement data (e.g., velocity information, acceleration data, direction, movement tracks, waypoints, indication that the mobile station 102 is not moving, vector information (e.g., velocity and direction of travel), inferred destination, determined mode of transport (which may be based on other movement data, and so forth), image data, light intensity information, location data (including altitude, addresses, coordinates, postal codes, city, state, province, neighborhood, country, nation, etc.), and so forth may be collected by the mobile station 102 at a time substantially near a time that the mobile station 102 successfully authenticates with the network 104 and/or is connected to the network 104. This contextual information 108 is associated with the authentication credentials.

Contextual information may also include information derived from browser data, such as keywords from captive portal data (including text, images, URL, etc.), keywords from network association information, keywords from out-of-band network 122 information, and so forth. For example, the content and keywords in a captive portal's text, images, etc. may be saved as contextual information and associated with authentication information. Therefore, embodiments may determine based on a keyword from one of various sources, that a particular authentication credential may work on that network (such as by matching the keywords in the network contextual information associated with the authentication credentials to network association information of a visited network).

Contextual information may also include other data, such as calendar data, email data, social networking data, or other data associated with a user that is associated with the mobile station 102. In some examples, a calendar appointment, email, social network post, or other user information indicates that the user will be travelling to a particular location, such as a particular train station or airport, to a particular hotel, office location, or other location. Based on this information, authentication profiles for the location or locations that the user is scheduled to travel to are provided.

The authentication credentials and associated contextual information 108 are stored in one or more learned roving authentication profiles 112. It may be that a single learned roving authentication profile is stored with all of the contextual information 108, or a plurality of learned roving authentication profiles are stored, each having a subset of the contextual information 108. In one example, the network 104 provides information that it is associated with roving consortiums A, B, and C. A single learned roving authentication profile 112 may be saved associating the authentication credentials with the roaming consortiums A, B, and C. In another example, three learned roving authentication profiles may be saved, a first learned roving authentication profile associating roaming consortium A with the authentication credentials, a second learned roving authentication profile associating roaming consortium B with the authentication credentials, and so forth. In another example, the mobile station stores a first learned roving authentication profile associating roaming consortium A with the authentication credentials, while a second learned roving authentication profile associates roaming consortia B and C with the authentication credentials. Other examples are possible without departing from the scope of embodiments. For example, a first learned roving authentication profile may associate location data and the presence of out-of-band network 122 with the authentication credentials while a second learned roving authentication profile associates one or more network associations with the authentication credentials.

In some embodiments, authentication credentials from one network may be associated with network contextual information from another network in the same or similar geographical area. Such geographically co-located networks may be related, such as a first network for guests and a second network for employees. In one example, a captive portal may be used to authenticate to a particular network that is related to another network (e.g., a "sister" network) in the same geographical area. Thus, the captive portal authentication credentials may be associated with network context information, such as network association information, broadcast by the other network in the same geographical information.

The mobile station 102 roves into an area covered by a network 114. The mobile station 102 queries an access point 116 for capability information. Where the network 114 is IEEE 802.11u and/or Hotspot 2.0 (HS20) compliant, the queries and associated responses may be via a Generic Advertisement Service (GAS) frames, via Access Network Query Protocol (ANQP), or other. Other networks using other protocols and standards may utilize other types of queries and responses. The network 114 responds with capabilities, including network association data. The mobile station 102 also obtains other contextual information associated with the network 114, using sensors in the mobile station, such a wireless radios, accelerometers, GPS receivers, light sensors, microphones, pressure sensors and touch sensors (such as on a touch-screen of the mobile station 102), and so forth. Audio data, movement data, image data, light intensity information, location data, and so forth may be collected by the mobile station 102 at a time substantially near a time that the mobile station 102 is connected to the network 114.

The mobile station 102 determines whether static authentication information is stored on the mobile station 102 that indicates a capability to authenticate to the network 114. The static authentication information may be a static authentication profile may be specific to the network 114 or may be a static roving authentication profile that corresponds to the network association information provided by the network 114. Where static authentication information is available, the mobile station 102 may utilize it to authenticate to the network 114.

In some embodiments, such as where no static authentication profile corresponding to the network 114 is available, the mobile station 102 determines whether to attempt to authenticate to the network 114 using the authentication credentials successfully used to authenticate to network 104 based at least partly on the contextual information 108 associated with the authentication credentials and the contextual information corresponding to the network 114. For example, the mobile station may determine whether there is at least a partial match between the contextual information associated with the authentication credentials from the network 104 and the contextual information corresponding to the network 114, such as the location information, presence of out-of-band network 124, network association information, and so forth.

The mobile station 102 attempts to authenticate to the network 114, such as via the AP 116 using the authentication credentials that were successfully used to authenticate to the network 104 (and which have been associated with the network contextual information stored in the mobile station 102). The network 114 and the network 104 may communicate, such as by using authentication, authorization, and accounting (AAA) servers 118 and 120, to authenticate the mobile station 102 to the network 114 using the authentication credentials. In any event, the mobile station determines whether the authentication attempt was successful. Based on the success (or lack thereof) of the authentication attempt, the mobile station 102 may modify the associations between the network contextual information 108 and the authentication credentials.

In one example, where the authentication attempt is successful, the mobile station 102 may de-associate portions of the network contextual information 108 that do not match the contextual information corresponding to the network 114. This de-association may include modifying the learned roving authentication profile 112 (such as by deleting the non-matching portions), or by creating a new learned roving authentication profile that associates the authentication credentials with the matching portions. Where a new, more specific learned roving authentication profile is created, the less specific learned roving authentication profile 112 may be retained, and may be given a lower priority for an authentication attempt than the new profile for future authentication attempts.

In one example, where the authentication attempt is unsuccessful, the mobile station 102 may de-associate portions of the network contextual information 108 that do match the contextual information corresponding to the network 114. This de-association may include modifying the learned roving authentication profile 112 (such as by deleting the matching portions), or by creating a new learned roving authentication profile that associates the authentication credentials with the non-matching portions. Where a new, more specific learned roving authentication profile is created, the less specific learned roving authentication profile 112 may be retained, and may be given a lower priority for an authentication attempt than the new profile when both profiles match another network.

Instead of or in addition to de-associating portions of network contextual information from the authentication credentials, embodiments may modify the associations in some other way, such as by modifying metrics associated with the network contextual information. Such metrics may be used in various ways. A priority metric may be utilized to determine a priority between two matching learned authentication profiles, such as is described in more detail with respect to FIG. 3. In some embodiments, a priority metric may apply to authentication profiles in general, including both learned profiles and static profiles. A profile may be given a priority metric based at least in part on whether it is learned or static. In some embodiments a static profile may be preferred over a learned profile, and such preference indicated at least in part based on a priority metric, although a static profile may in some embodiments just be generally preferred regardless of the presence of priority metrics. Where two static profiles are available to match to one or more detected networks, priority metrics may be utilized to determine which one of the two static profiles to use to make a connection attempt. A threshold count metric may prevent a de-association of a portion of network contextual information from the authentication credentials until a threshold number of successful or unsuccessful attempts are made.

A designation may be used to determine whether to persist an association between contextual information and authentication credential, such as where the association (e.g., a learned roving authentication profile) has been used successfully to rove to networks a threshold number of times. Persisting the association causes the association to be retained, not deleted or modified, even if there are unsuccessful attempts. In some embodiments, the mobile station therefore stores the number of successful and unsuccessful attempts, and determines whether the successful attempts for an association meets or exceeds a predetermined threshold and, if the number does meet or exceed the threshold, mark the association as being persisted, or not to be deleted. In some embodiments, a learned roving authentication profile has been specialized beyond a certain threshold (e.g. some or all of the elements are now completely specific, matching only one possible value), it is persisted, and prevented from being deleted. Other examples of persisting profiles are possible without departing from the scope of embodiments.

In the example illustrated in FIG. 1, a portion of the network contextual information 108—"network context 2"—is deleted from the network contextual information 108. In this example, it may be because the "network context 2" portion matched at least a portion of the contextual information associated with the network 114, and the authentication attempt was unsuccessful, thereby resulting in de-associating the "network context 2" portion. Or it may be that both the "network context 1" and "network context 3" portions matched at least a portion of the contextual information associated with the network 114, and the authentication attempt was successful, thereby resulting in de-associating the "network context 2" portion. Other examples are possible without departing from the scope of embodiments. Persisting a profile prevents a successful profile from being deleted, or from having portions of its network contextual information 108 being removed or de-associated from the authentication credentials based on a random failure to authenticate, which may be caused by a network failure, a misconfiguration of an access point, or something else that is not representative of a problem with the profile itself.

Portions of a learned roving authentication profile may be de-associated from the authentication credentials (e.g., removed from the learned roving authentication profile 112), based on a "quorum;" e.g., after a certain threshold number of successful or failed attempts. For example, a particular network association may be removed from the learned roving authentication profile 112 after a certain number of failed attempts to rove to visited networks matching that particular network association, or after a certain number of successful attempts to rove to visited networks that do not match that particular network association. Other examples are possible without departing from the scope of embodiments.

In some embodiments, where roving is disabled on the mobile station 102, automatic attempts to using a learned roving authentication profile to rove onto the network 104 (or other visited network) are disabled. However, in some circumstances, roving with a learned roving authentication profile may be attempted even where roving is disabled. For example, where the stored authentication credentials from the learned roving authentication profile 112 lists an NAI realm as part of the network contextual information 108, and the NAI realm is in a HESSID's list of home domains, roving may be enabled in that particular case. Other examples are possible without departing from the scope of embodiments.

Some embodiments may place a limit on the number of learned roving authentication profiles 112 that are stored on the mobile station 102, and may also place limits on their longevity (how long they may be kept and/or used for roving authentication attempts on the mobile station 102). Some embodiments may also place limits on the number of attempts that may be undertaken to attempt to rove onto a visited network using a learned roving authentication profile.

For security reasons, the mobile station 102 may be configured to prevent an attempt to authenticate to a visited network where the authentication techniques employed would leave the authentication credentials vulnerable to capture by a nefarious operator of the visited network. Thus, known insecure authentication techniques (such as those that pass authentication credentials in clear text, or those with known vulnerabilities that would enable a bad actor to recreate the authentication credentials from the information provided by an authenticating device), prevents automated attempts to authenticate using learned roving authentication profiles.

Some embodiments may attempt to rove to all visited networks that advertise any network associations, or that are otherwise associated with any network association (such as based on location data or other), using any and all previously successful authentication credentials. When such brute force attempts are successful, a learned roving authentication profile is generated associating the successfully used authentication credentials with the network contextual data associated with the visited network.

The mobile station 102 is illustrated in FIG. 1 as being a handheld wireless device, such as a mobile telephone. But embodiments are not limited to mobile stations of any one type or types. The mobile station 102 may be a desktop computer, a laptop computer, a tablet computer, a game console, an electronic book reader device, a media player, a streaming media console, a network-enabled appliance, and so forth.

Figure 2:
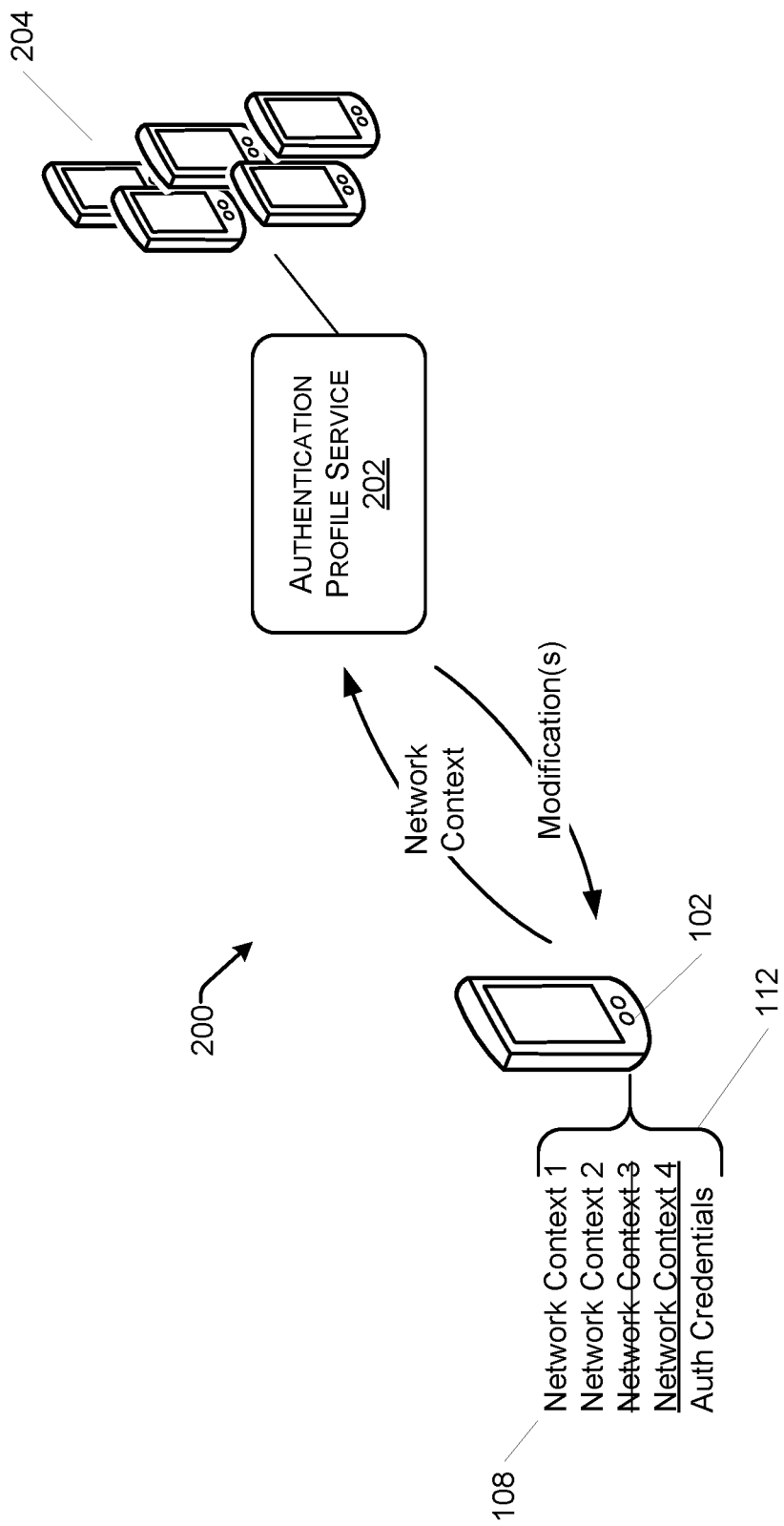
FIG. 2 illustrates an example environment including an authentication profile service to provide modifications to learned roving authentication profiles.

FIG. 2 illustrates an example environment 200 including an authentication profile service 202 to provide modifications to learned roving authentication profiles. The mobile station 102 transmits information regarding the network contextual information 108 associated with the authentication credentials to the authentication profile service 202. In reply, the authentication profile service 202 provides information indicating one or more modifications to the network contextual information 108. The information transmitted to the authentication profile service 202 includes, in some embodiments, data regarding the success of authentication credentials in successfully roving to networks—such as the network 104—based on the network contextual information 108. The information may include whether the authentications were successful, the network contextual information associated with the networks to which authentication attempts were made, and so forth. The mobile station 102 may transmit all of the network contextual information 108, or only a portion of it. The mobile station may transmit the learned roving authentication profile 112 (including the authentication credentials). The mobile station 102 may refrain from transmitting the authentication credentials.

The modifications to the contextual information 108 may include deletions, modifications, additions, or replacement of information. Examples include additions of location data, such as may be based on sensor data, such as location data or data indicating the presence of out-of-band networks present in the contextual information 108. For example, where the contextual information includes first location data for a network (such as the network 104 in FIG. 1), the authentication profile service 202 may provide additional locations that are determined to be associated with the first location data. In another example, the presence of out-of-band networks (such as a collection of unrelated Wi-Fi networks, although they may include other types of networks, such as cellular networks, Bluetooth® Networks, and so forth) may correspond to a known location, and the contextual information 108 updated with the location data (e.g., coordinates)) of this known location as well as other locations associated with the known location. To see where this would be useful, the first location of a network from which a learned roving authentication profile is produced may be the location of an entity with several locations, such as a retail chain, a university, an employer, and so forth. Thus, the addition of location information may include the other locations of the entity associated with the first location. Being associated with a single entity may indicate that the authentication credentials successfully used to authenticate at a first location of the entity may also be usable to authenticate at a second location of the entity, although this cannot be known for certain. The addition of information may be other location data, network association information (e.g., HESSIDs, roaming consortium OIs, domains, and so forth), or other sensor data determined to correlate or possibly correlate with the network contextual information 108.

Modifications of data from the contextual information 108 may be based on a determination whether portions of the contextual information 108 are relevant to other network contexts. Such relevance may be determined for example, from data obtained from a population 204 of mobile stations. Given a sufficiently large number of mobile stations in the population 204, each providing contextual information associated with their learned or static roving authentication profiles, contextual information associated with networks that the mobile stations attempt to rove to using learned roving authentication profiles, information regarding whether such attempts are successful, etc., the authentication profile service 202 determines probabilities regarding whether authentication credentials associated with network contextual information in a first network context are likely to be successfully used to rove to a second network having a second network context. Various machine learning, combinatorial, statistical, or rule-based techniques may be utilized to train the authentication profile service 102 in this regard.

As mentioned previously, the authentication profile service 202 may provide modifications to the network contextual information 108 based on, among other things, sensor data such as location data. Correlations between different locations may be inferred using the authentication attempt data from the population 204 of the mobile stations. Alternatively or in addition, the correlations between locations may be based on one or more of known locations of an entity and correlations between certain locations and certain network association data. Correlations between locations, whether inferred or not, indicate the potential for a common network association to be supported by networks at some or all such correlated locations.

Various data from the population 204 of mobile stations may be utilized to determine the relevance of other sensor data. In one example, the presence of out-of-band networks may indicate location. Location may be inferred from out-of-band networks based on one or more correlations between location data, network association information, and out-of-band network presence data from a number of mobile stations in the population 204.

Other sensor data such as audio data, image data, and so forth may also be utilized to infer location or other network contextual information. For example, a user may take a photograph of a storefront, and the authentication profile service 202 may determine the location of the user using image matching, and based on the inferred location provide modifications to the network association information included in a learned roving authentication profile. In another example, a microphone on a mobile station 102 may pick up background audio, transmit that background noise to the authentication profile service 202, which determines from the background audio that the mobile station 102 is present at an airport, train station, or other location with known audio signatures (such as may be determined from a large number of mobile stations in the population 204). Other examples are possible without departing from the scope of embodiments.

Modifications may be additions of network association information. For example, based on the population 204 of mobile stations, it may be determined that authentication credentials associated with a first network association (HESSID, OI, domain, etc.) are often successfully utilized to rove to network supporting a second network association. The network contextual information 108 may be updated to reflect this information, such as based on the modifications provided by the authentication profile service 202.

Other modifications may include modifications to priority information, such as priority metrics, as are described in more detail elsewhere within this Detailed Description. Modifications may be provided by the authentication profile service 202 initially after profile creation, such as after the learned roving authentication profile 112 and/or the network contextual information 108 is correlated with authentication credentials, after the learned roving authentication profile is utilized in one or more a roving attempts, or at some or all during various stages of deployment of the learned roving authentication profile 112.

Figure 3:
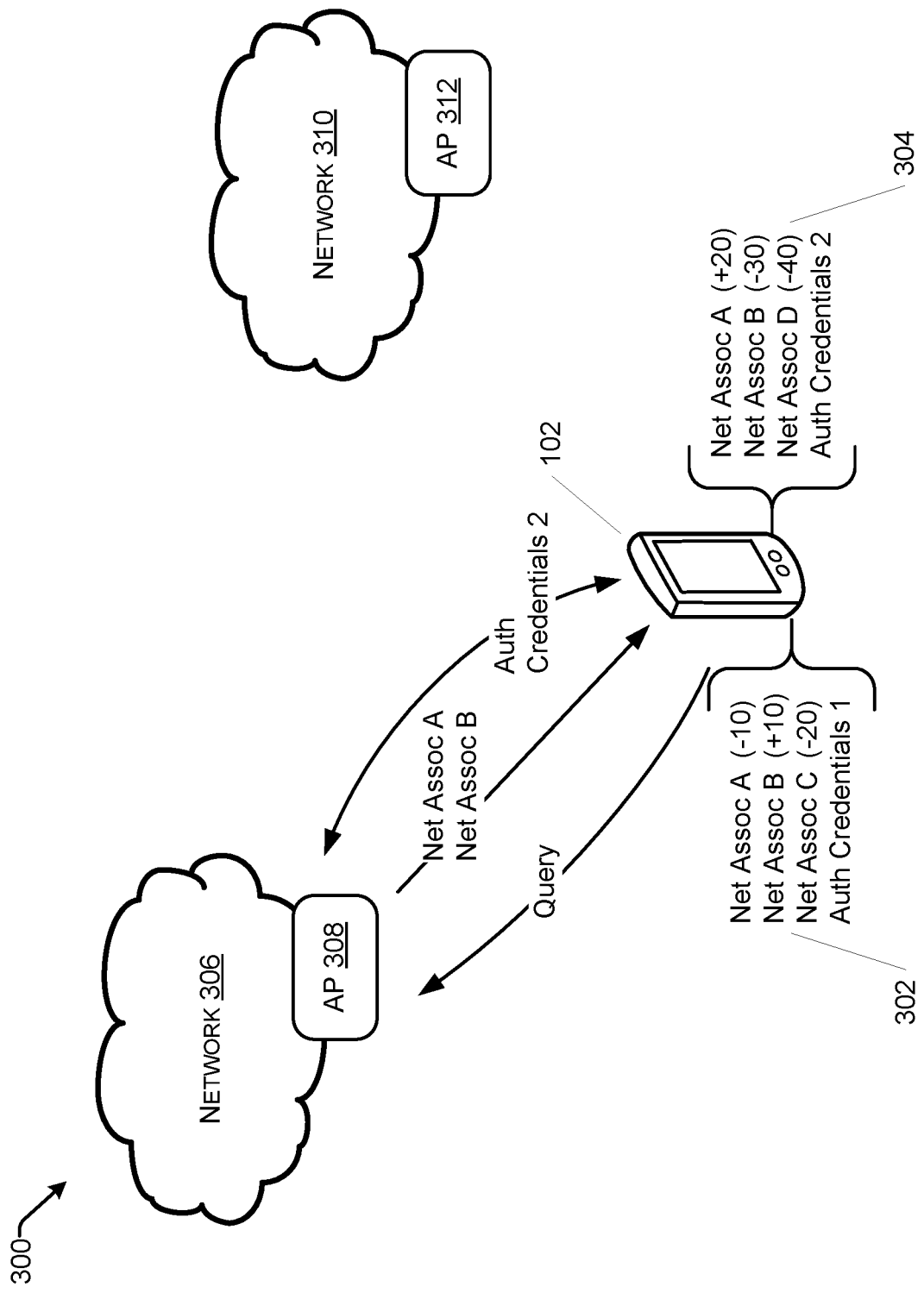
FIG. 3 illustrates an example environment for prioritizing amongst learned authentication profiles.

FIG. 3 illustrates an example environment 300 for prioritizing amongst learned authentication profiles. As illustrated in FIG. 3, the mobile station 102 includes two learned roving authentication profiles 302 and 304. Priority information for various portions of the learned roving authentication profiles 302 and 304 are shown in parenthesis. Although FIG. 3 is illustrated with learned roving authentication profiles 302 and 304 that each include multiple portions of network contextual information, some embodiments also utilize multiple learned roving authentication profiles to represent each of the portions of network contextual information, with priority information applying to each one. Approaches to prioritizing the learned roving authentication profiles are similar or the same in either case. Where multiple profiles are utilized, the priority information may apply to the entire profile, rather than to portions of them. And in embodiments where portions of network contextual information are stored in a single profile, and priority information applied to such portions individually, the profile may also have a separate profile priority.

The priority information may be provided to the mobile station 102 by an authentication profile service, such as by the authentication profile service 202. Alternatively or in addition, the priority information may be determined by the mobile station 102. In some embodiments, the priority information is determined based on attempts to rove to visited networks using the learned roving authentication profiles 302 and 304. In some embodiments, a successful attempt to rove to a visited network using one of the learned roving authentication profiles 302 and 304 results in a portion of the learned roving authentication profiles 302 and 304 that match the contextual information of the visited network having an increase (or decrease) in its priority metric. In some embodiments, an unsuccessful attempt to rove to a visited network using one of the learned roving authentication profiles 302 and 304 results in a portion of the learned roving authentication profiles 302 and 304 that match the contextual information of the visited network having an increase (or decrease) in its priority metric.

The priority metrics may be unitless. The priority metrics may be non-numerical. The priority metrics may take on various values or range of values, may be one of a plurality of finite discrete values, may have a minimum and/or a maximum value, and so forth. In some embodiments, a high priority metric provides the network contextual information (and its associated authentication credentials) a relatively higher selection priority, while in other embodiments a high priority metric provides the network contextual information (and its associated authentication credentials) a relatively lower selection priority. Embodiments are not limited to any type or types of priority metrics, or means of determining priority amongst learned roving authentication profiles.

In the example illustrated in FIG. 3, learned roving authentication profile 302 has a priority metric of −10 for network association A and a priority metric of +10 for network association B, while learned roving authentication profile 304 has a priority metric of +20 for network association A and a −30 for network association B. As the mobile station 102 comes into a geographical area serviced by the network 306, the mobile station queries the network 306 (such as via the AP 308) for contextual information, such as network association information. The AP 308 replies back with data indicating that the network 306 belongs to network association A and network association B, such that authentication credentials associated with network association A and network association B can be used to authenticate to network 306.

For the sake of illustration, it is assumed that it is unknown whether the authentication credentials 1 and the authentication credentials 2 in the learned roving authentication profiles 302 and 304, respectively, are usable to authenticate to networks that participate in network association A and network association B. Rather, as noted elsewhere within this Detailed Description, authentication credentials 1 and authentication credentials 2 have both been associated with network association A and network association B by virtue of a concurrence of successful authentications using authentication credentials 1 and authentication credentials 2 to networks with corresponding network contexts that indicate that they participate in network association A and network association B. The authentication credentials 1 and the authentication credentials 2 may have worked to authenticate to the prior networks because they are network association A and network association B credentials, but this cannot be determined based on the information available to the mobile station 102.

In one embodiment, since it is not known whether one or both of authentication credentials 1 and the authentication credentials 2 are usable to rove onto network 306, one set of credentials is selected for an initial attempt. Because authentication attempts use both power and bandwidth, it is useful to choose one of authentication credentials 1 and the authentication credentials 2 that have the greatest chance of success in order to reduce possible power and bandwidth consumption used during an authentication attempt.

Since network 306 advertises that it participates in network association A and network association B, the mobile station the priority metrics corresponding to the learned roving authentication profiles 302 and 304 may be used to determine the credentials that are selected for a first attempt to authenticate to network 306. Learned roving authentication profile 302 has a higher priority metric (+10) for network association B than does the learned roving authentication profile 304 (priority metric of −30). This may be due to previously successful attempts to authenticate to networks participating in network association B using the learned roving authentication profile 302 and unsuccessful attempts to authenticate to networks participating in network association B using the learned roving authentication profile 304. Similarly, learned roving authentication profile 302 has a lower priority metric (−10) for network association A than does the learned roving authentication profile 304 (priority metric of +20).

Overall, the highest priority for the advertised network association A and network association B belongs to learned roving authentication profile 304 (priority metric of +20 for network association A). Therefore, in this example, a first attempt to authenticate to network 306 may utilize authentication credentials 2 in learned roving authentication profile 304. Where the attempt is successful, the priority information associated with learned roving authentication profile 304 may be updated. Where the attempt is unsuccessful, the priority information associated with learned roving authentication profile 304 may be updated, and authentication credentials 1 associated with learned roving authentication profile 302 may be tried on a second or subsequent attempt to authenticate to network 306. Based on the success or lack thereof of the attempt to authenticate to network 306 using authentication credentials 1, the priority information for learned roving authentication profile 302 may be updated.

Other examples of updating priority information, and of using priority information to select between learned roving authentication profiles for an authentication attempt, may be used by the mobile station 102 without departing from the scope of embodiments. For example, a learned roving authentication profile that is more specific to a network context of the visited network may be used to attempt an authentication before a more general profile. In one specific example, a first learned roving authentication profile having network contextual information indicating that its authentication credentials are associated with network association A only may have priority over a second, more general, learned roving authentication profile having network contextual information indicating that its authentication credentials are associated with both network association A and network association B.

Also illustrated in FIG. 3 is network 310, which includes AP 312. The network 310 may be detected at the same geographical location as the network 306, or more generally is detected at the same time by the mobile station 102. Prior to querying and/or attempting to authenticate to network 306, the mobile station 102 decides which of the two networks to query and/or attempt to authenticate to first. More generally, the mobile station 102 prioritizes networks that it encounters for querying and/or authentication attempts. In some embodiments, the selection algorithm may utilize an ordered list. The list may be ordered, for example, based at least in part on strength of signal strength, but it may be based on other factors such as network bandwidth, or other information. In some embodiments, a selection algorithm may select a network to query based on user preferences. In some embodiments, a selection algorithm may select a network to query, and/or attempt to authenticate to, based at least in part on the network contextual information, such as based on network association information, location data, motion data, velocity, path, track, destination, user data (e.g., calendar data, email data, social context), and so forth.

Where no static authentication profiles match one of the networks, the selection algorithm may attempt to authenticate to other networks whose network contextual information matches either static or roving authentication profiles. Static authentication profiles (such as static roving authentication profiles) may be preferred over learned profiles (such as learned roving authentication profiles) in some embodiments. In one example, a first roving authentication profile, such as the roving authentication profile 302 may match network 306, while a second roving authentication profile, such as roving authentication profile 304 may match network 310. An attempt to authenticate to network 306 over network 308 may be based at least in part on the strength of the matches, such that the network/profile pair with the strongest match is selected for a first authentication attempt, and so on. Where an authentication attempt fails, the profile is updated as described elsewhere within this Detailed Description and another network and/or another learned roving profile is selected for another authentication attempt. Other examples are possible without departing from the scope of embodiments.

Figure 4:
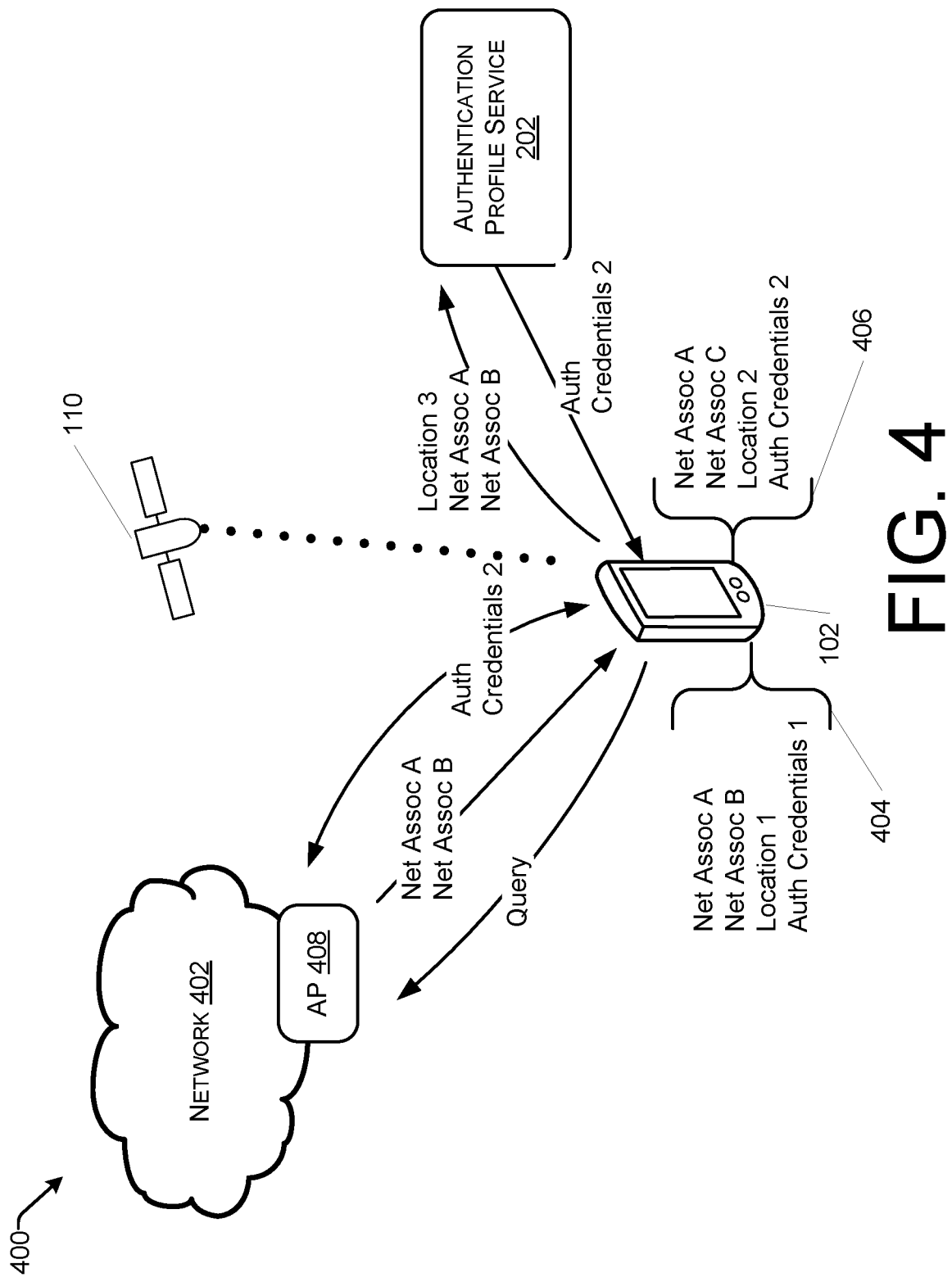
FIG. 4 illustrates an example environment including an authentication profile service to select authentication credentials to be used to attempt to rove to a network.

FIG. 4 illustrates an example environment 400 including an authentication profile service 202 to select authentication credentials to be used to attempt to rove to a network 402. The mobile station 102, in the example illustrated in FIG. 4, includes learned roving authentication profiles 404 and 406. When the mobile station enters a geographical area serviced by the network 402, the mobile station 102 obtains contextual information corresponding to the network 402, such as by querying the network 402 (such as via the AP 408) for network association information, obtaining location information (such as from GPS satellite system 110), and so forth.

In the example illustrated in FIG. 4, the contextual information corresponding to the network 402 includes network association A, network association B, and location 3. The mobile station 102 provides the contextual information corresponding to the network 402 to the authentication profile service 202. The authentication profile service 202 replies with an indication of the authentication credentials that are to be used to authenticate to the network 402. For example, the authentication profile service 202 may identify one of the learned roving authentication profiles 404 and 406, provide an authentication profile, or provide some other identifier that the mobile station 102 associates with the authentication credentials. In one particular example, the mobile station 102 provides location information, available network information, or other contextual information to the authentication profile service 202, and in response the authentication profile service 202 provides authentication credentials to be used to authenticate to a network.

In another example, the authentication profile service 202 determines authentication credentials based on other contextual information (e.g., information related to the user of the device such as emails, calendar, cached credentials in the browser, web history, etc.) that are previously obtained and collected and may provide the mobile station with the determined authentication credentials to be used to authenticate to a network. In some examples, a calendar appointment, email, social network post, or other user information indicates that the user will be travelling to a particular location, such as a particular train station or airport, to a particular hotel, office location, conference room, or other location. Based on this information, authentication profiles for the location or locations that the user is scheduled to travel to are provided.

Alternatively or in addition, the authentication profile service 202 may determine which authentication credentials (or learned roving authentication profile) to utilize to attempt to authenticate to the network 402 based on correlations determined based on data obtained from a plurality of mobile stations, such as the population 204 of mobile stations described in FIG. 2. The authentication profile service 202 may take in as input the learned roving authentication profiles 404 and 406 present on or otherwise associated with the mobile station 102, the network contextual information corresponding to the network 402, and provide as an output the identity of the profile to be used to attempt to authenticate to the network 402. In some embodiments, the authentication credentials may be provided to the mobile station 102 based on user information, such as calendar information, email content, social networking data, and so forth. For example, the context information provided by the mobile station 102 may include calendar data, email data, social networking data, and so forth, that indicates a location that the user associated with the mobile station 102 is scheduled to be present at, either currently or at a future time. The mobile station 102 may provide the user information to the authentication profile service 202, such as either the original data (e.g., the emails and calendar data) or as date and/or location data derived from the user data. The authentication profile service 202 may also receive this information separately, such as from a social networking site, from an online calendar and email service, and so forth, and not directly from the mobile station 102. The authentication profile service 202 may provide authentication profile information 406 to the mobile station 102 that includes network context information and authentication credentials that are associated, either statically or learned, to the locations determined from the user data.

The ability of the mobile station 102 to utilize the authentication profile service 202 depends on network connectivity to the authentication profile service, such as via a cellular network service or other network. Because cellular network service utilizes more battery power and typically costs more than utilizing a Wi-Fi or other wireless local area network (WLAN), use of the authentication profile service 202 may enable the mobile station 102 to save power and bandwidth (and potentially the costs of bandwidth) by determining to automatically attempt to authenticate to network 402.

In some embodiments, the authentication profile service 202 may determine that the mobile device is able, or potentially able, to connect to the network 402 based on location data without receiving network association data, and perhaps without Wi-Fi capabilities (or other wireless capabilities) being turned on in the mobile device 102. In one example, location data (either received from the device or inferred from other user information such as calendar data, emails, social network post, or other) may indicate that the mobile device 102 is within range of the network 402 and some other data, such as account data (e.g., an electronic bill from a provider associated with the network 402, or a provider known to have a roving internetworking arrangement with the network 402), indicates that the mobile device has available authentication credentials to connect to the network 402. The authentication profile service may transmit an indication to attempt to connect to the network 402. Based on the location data and the other data (e.g., account data), the authentication profile service 202 may also provide or otherwise identify to the mobile device authentication credentials that are potentially usable to connect to the network 402. Other examples are possible without departing from the scope of embodiments.

Figure 5:
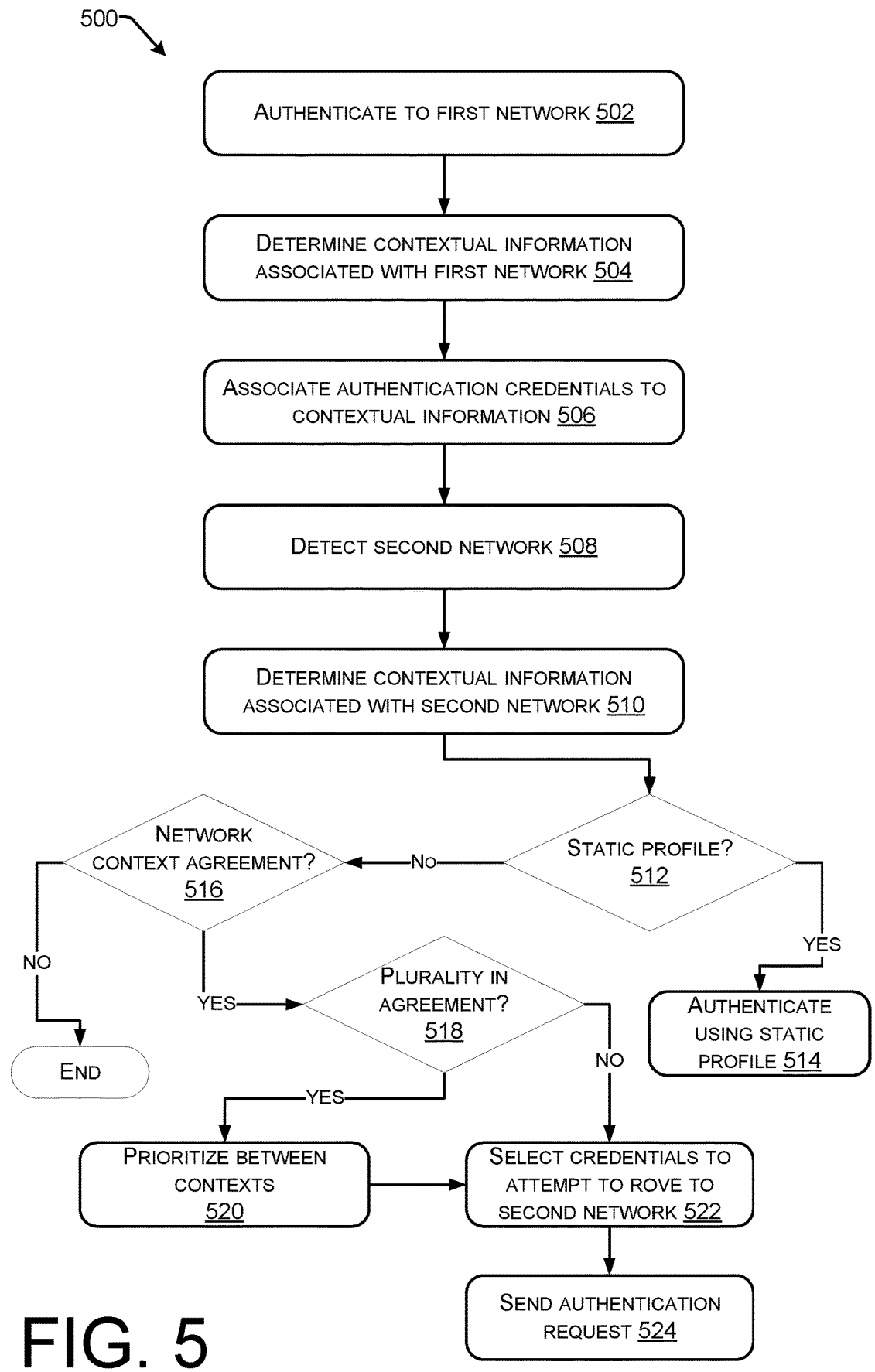
FIG. 5 illustrates an example process for creating a learned roving authentication profile.

FIG. 5 illustrates an example process 500 for creating a learned roving authentication profile. At 502, a mobile station, such as the mobile station 102, authenticates to a first network using authentication credentials. The authentication to the first network may be by several means, such as automatically by using a roving authentication profile, a learned roving authentication profile, a static authentication profile, and so forth, or based on manually entered authentication information, a captive portal authentication technique, and so forth. Where brute force is used to learn authentication profiles in some embodiments (e.g., trying multiple authentication credentials even in the absence of agreement in network contextual information), the authentication at 502 may be attempted based on the network merely advertising any of several types of network associations, whereby credentials associated with the network association are usable to rove onto the network. In some embodiments, the authentication at 502 is attempted based merely on the network advertising that it is a Hotspot 2.0 compliant network, or similar.

At 504, the mobile station determines contextual information associated with the first network. The contextual information includes network association information, such as may be advertised by the first network (or an AP of the first network), this may include among other things one or more of a homogeneous extended service set identifier (HESSID), a roaming consortium organization identifier (OI), a domain name or identifier, a network address identifier (NAI) realm list, cellular information, and an access network query protocol (ANQP) vendor-specific list, and so forth. The contextual information includes data obtained by the mobile station using sensor data, such as location data (such as GPS data, cellular network triangulation, etc.), presence of out-of-band networks, light and image data, audio data, accelerometer data, and so forth.

At 506, the mobile station associates, based at least on a successful authentication to the first network using the authentication credentials, the authentication credentials with the first contextual information. This includes, in various embodiments, storing the authentication credentials and contextual information in one or more learned roving authentication profiles. Such learned roving authentication profiles are distinguished from conventional, static roving authentication profiles such as conventional HS20 profiles based on their having been learned from the concurrence of a successful roving attempt to a network and the network contextual information associated with the network.

At 508, the mobile station roves to a coverage area served by a second network, such as the network 114 of FIG. 1, and detects the second network. The visited network may be an 802.11 compliant network or other network type.

At 510, the mobile station determines contextual information associated with the second network. The contextual information includes network association information, such as may be advertised by the second network (or an AP of the second network), this may include among other things one or more of a homogeneous extended service set identifier (HESSID), a roaming consortium organization identifier (OI), a domain name or identifier, a network address identifier (NAI) realm list, cellular information, and an access network query protocol (ANQP) vendor-specific list, and so forth. The contextual information includes data obtained by the mobile station using sensor data, such as location data (such as GPS data, cellular network triangulation, etc.), presence of out-of-band networks, light and image data, audio data, accelerometer data, and so forth.

At 512, the mobile station determines whether a static profile, such as a conventional authentication profile for the second network or a static roving authentication profile is available to the mobile station to authenticate to the second network. Such a static profile may include authentication credentials indicated as being definitely usable to authenticate to networks with contextual information that matches contextual information in the static profile. Thus, in some embodiments, static profiles are preferred over learned roving authentication profiles when static profiles are available. At 514 (the "YES" path), the mobile station authenticates to the second network using authentication credentials stored in the static profile.

At 516 (the "NO" path), the mobile station determines whether there is agreement, match, association, correspondence, correlation, and/or overlap between the first network contextual information in a learned authentication profile having other authentication credentials (e.g., associated with network contextual information in a learned roving authentication profile stored in the mobile station), and the second network contextual information associated with the second network. Determining whether there is agreement includes in some embodiments attempting to match network association information, such as HESSID, domain names, roaming consortium OIs, cellular providers, and types of network association advertised by the second network with the same or similar type of information stored in the mobile station and associated with authentication credentials (e.g., in a learned roving authentication profile). In some embodiments, an agreement between the first network contextual information and the second network contextual information may be determined based on a lack of correlation. In other words, the first network contextual information associated with the authentication credentials may be "negative" contextual information that indicates network contextual information from networks for which the authentication credentials were not successful in one or more connection attempts. Thus, in these embodiments, the mobile device attempts to connect to the network when the first network contextual information does not match the second contextual information. As used herein, an "agreement" between the first network contextual information and the second network contextual information" includes a match or partial match, as well as a lack of a match, such as where such "negative" contextual information is associated with the authentication credentials.

Determining whether there is agreement includes in some embodiments identifying a correlation between location information associated with physical locations associated with the authentication credentials, and physical location information associated with the visited, second network. Such location information stored in the mobile station and association with the authentication credentials may be inferred location information, such as based on presence of out-of-band networks or other data obtained from or derived from sensors on the mobile station. Such location information may be provided by a profile service, as described in more detail elsewhere within this Detailed Description.

Determining whether there is agreement includes in some embodiments providing data to an authentication profile service, such as the authentication profile service 202, and receiving in response an indication of the authentication credentials to be used to rove onto the second network. The indication includes, in some embodiments, an identification of the roving authentication profile, or other indication.

At 518 (the "YES" path), the mobile station determines whether a plurality of authentication credentials are associated with contextual information that at least partially matches the second contextual information of the second network. If so, then the mobile station attempts to prioritize amongst the authentication credentials that are in agreement with the network contextual information of the second network.

At 520, the mobile station prioritizes the plurality of authentication credentials for the attempt to authenticate to the second network. The mobile station may prioritize the authentication credentials based on information provided by an authentication profile service. The mobile station may prioritize the authentication credentials based on priority information associated with the learned roving authentication profiles, or portions thereof, as described in more detail elsewhere within this Detailed Description. In some embodiments, the authentication credentials may be prioritized based on user preferences, or based on other preferences. For example, a selection algorithm may prioritize authentication credentials based at least in part on agreement between network association information over agreement with physical location information, or other sensor-derived data. In another example, the selection algorithm may prioritize authentication credentials based on agreement with certain types of network association information over other types of network association information, such as HESSIDs being preferred over roaming consortium OIs when they both match, and so forth. Prioritizing, in various embodiments, is based at least on one or more of degrees of similarity between the contextual information associated with the plurality of authentication credentials and the second contextual information of the second network, specificity of the contextual information associated with of the plurality of authentication credentials, information regarding previous attempts to authenticate using the contextual information associated with the plurality of authentication credentials, user preferences with respect to the contextual information associated with the plurality of authentication credentials, and so forth. Other examples are possible without departing from the scope of embodiments.

At 522, the mobile station selects, based on their being some agreement between the network contextual information, the authentication credentials to be used to attempt to authenticate to the second network. The mobile station may also utilize input from an authentication profile service— such as the authentication profile service 202—to select authentication profiles for the roving attempt.

At 524, the mobile station sends a request to the second network to authenticate using the other authentication credentials, as part of an attempt to authenticate to the second network. This is based, in some embodiments, at least in part on determining at 516 that the first contextual information at least partly corresponds to the second contextual information.

Figure 6:
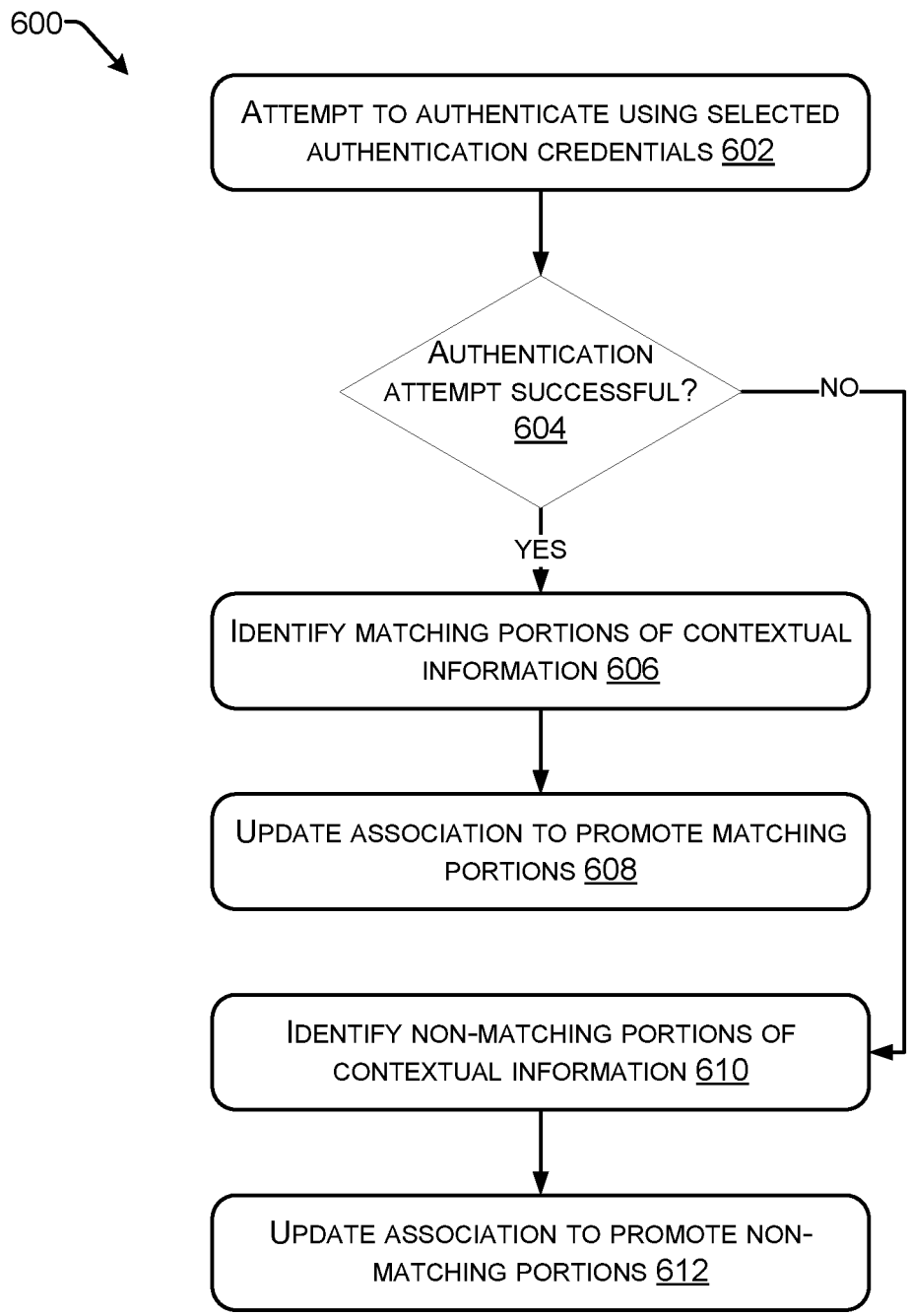
FIG. 6 illustrates an example process for attempting to rove to a visited network using a learned roving authentication profile and modifying the learned roving authentication profile based on whether the roving attempt is successful.

FIG. 6 illustrates an example process 600 for attempting to rove to a visited network using a learned roving authentication profile and modifying the learned roving authentication profile based on whether the roving attempt is successful. At 602, a mobile station, such as the mobile station 102, attempts to rove to a second network using authentication credentials selected for the attempt, such as based at least on second contextual information of the second network and the first contextual information associated with the authentication credentials indicating that the second network is part of a common association of networks that supports roving internetworking between them (such as is described with respect to FIG. 5). In some embodiments, the attempt to connect to the second network may utilize a brute force method. In a brute force method, some or all of the authentication credentials known or assumed to be "good" for at least one network (because for example, such authentication credentials were previously successful at authenticating to another network or the authentication credentials are stored in a static profile) are utilized to attempt to authenticate to the visited network. A brute force method may include attempting to connect to the network using authentication credentials without first determining whether there is an agreement, match, or correlation (partial or otherwise) between the contextual information associated with the authentication credentials and the network contextual information associated with the network. Brute force methods may be paired with embodiments that utilize "negative" contextual information, such that the authentication profile maintains contextual information about networks for which use of the authentication credentials were unsuccessful. In these embodiments, unsuccessful attempts to connect to a network using a brute force attempt results in storing the network contextual information for the network as negative contextual information associated with the authentication credentials. In these embodiments, the authentication credentials are not tried again with other networks that have network contextual information that completely or partially matches the negative network contextual information stored and associated with the authentication credentials.

At 604, the mobile station determines whether the roving authentication attempt is successful. Where the attempt is successful (the "YES" path), at 606, the mobile station (or an authentication profile service), identifies those portions of the contextual information associated with the authentication credentials (such as in a learned roving authentication profile) that are in agreement with the network contextual information of the second network (the visited network) that is successfully roamed to. Identification of the agreeing portions of the network contextual information includes, in some embodiments, identifying those portions of the network contextual information that caused the authentication credentials to be used in a roving attempt in the first place (such as is described with respect to element 516 in FIG. 5).

At 608, the mobile station or an authentication profile service updates the association information on the mobile station to promote the learned roving authentication profile and/or to promote the agreeing or matching portions of the network contextual information. Promoting the learned authentication profile (or the association between authentication credentials and the network contextual information more generally), may include deleting non-matching profiles, reducing a priority of the non-matching profiles, increasing a priority of the matching profiles, and so forth. Promoting the agreeing or matching portions of the network contextual information includes, in various embodiments, deleting or de-associating non-agreeing or matching portions from their association with the authentication credentials, increasing priority information associated with the agreeing or matching portions of the network contextual information, decreasing priority metrics associated with the agreeing or matching portions of the network contextual information, and so forth.

Promoting may be based on having reached a certain threshold number of successful attempts (e.g., achieving a quorum). This may include marking a successful association between authentication credentials and network contextual information as being persisted based on having reached a threshold number of successful authentication or roving attempts using the association between the authentication credentials and network contextual information. Another example includes deleting or de-associating non-matching or non-agreeing network contextual information from a profile after a certain number of successful attempts using the profile. Other examples are possible without departing from the scope of embodiments.

At 610 (the "NO" path, where the roving attempt is not successful), the mobile station (or an authentication profile service), identifies those portions of the contextual information associated with the authentication credentials (such as in a learned roving authentication profile) that do not match or are not in agreement with the network contextual information of the second network (the visited network). Identification of the non-agreeing portions of the network contextual information may be based, in some embodiments, on those portions of the network contextual information that caused the authentication credentials to be used in a roving attempt (such as is described with respect to element 516 in FIG. 5), and identifying the other portions of the network contextual information.

At 612, the mobile station or authentication profile service updates the association information on the mobile station to promote the non-matching learned roving authentication profile and/or to promote the non-agreeing or non-matching portions of the network contextual information. Promoting the learned authentication profile (or the association between authentication credentials and the network contextual information more generally), may include deleting matching profiles, reducing a priority of the matching profiles, increasing a priority of the non-matching profiles, and so forth. Promoting the non-agreeing or non-matching portions of the network contextual information includes, in various embodiments, deleting or de-associating agreeing or matching portions from their association with the authentication credentials, increasing priority information associated with the non-agreeing or non-matching portions of the network contextual information, decreasing priority information associated with the non-agreeing or non-matching portions of the network contextual information, and so forth.

As with promotion based on successful attempts, promoting may also be based on having reached a certain threshold number of unsuccessful attempts (e.g., achieving a "quorum"). This may include marking an unsuccessful association between authentication credentials and network contextual information for deletion based on having reached a threshold number of unsuccessful authentication or roving attempts using the association between authentication credentials and network contextual information. Another example includes deleting or de-associating portions of the network contextual information that is matching or agreeing only after a certain number of unsuccessful attempts using the matching or agreeing network contextual information. Other examples are possible without departing from the scope of embodiments.

In alternative embodiments, network contextual information associated with authentication credentials may be "negative" contextual information that indicates network contextual information from networks for which the authentication credentials were not successful in one or more connection attempts. Thus, in these embodiments, the mobile device to attempts to connect to the network when the first network contextual information does not match the second contextual information. Such "negative" contextual information may, in some embodiments, be captured using a "brute force" method, as described above.

Figure 7:
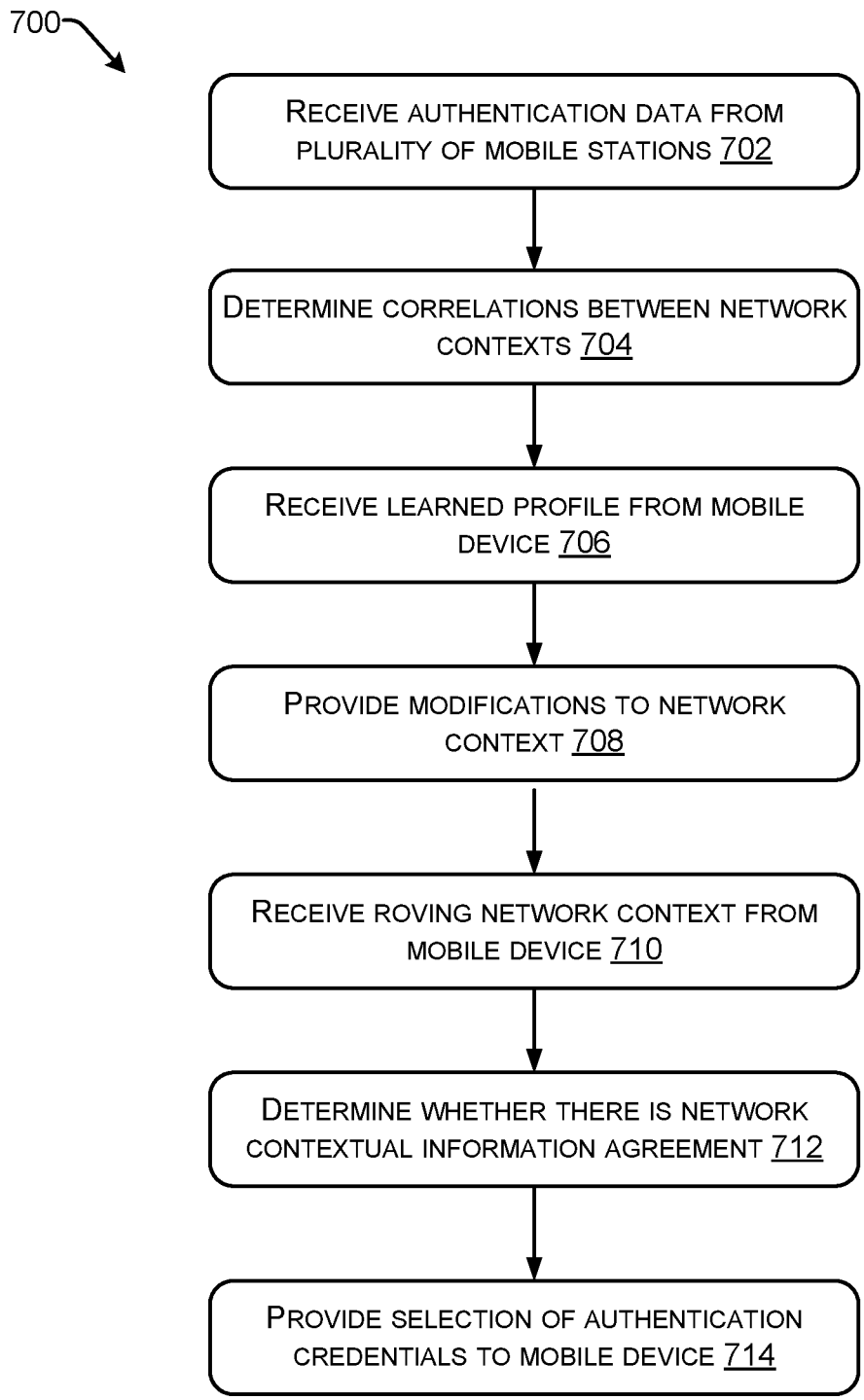
FIG. 7 illustrates an example process for providing an authentication profile service to a mobile station.

FIG. 7 illustrates an example process 700 for providing an authentication profile service to a mobile station. At 702, an authentication profile service—such as the authentication profile service 202—receives authentication data corresponding to a plurality of mobile stations, such as the population 204 of mobile devices described above with respect to FIG. 2. The authentication data includes, among other things, learned associations between authentication credentials and network contextual information, data regarding success and failure of roving attempts using learned associations, network context data of visited networks for which authentication and roving attempts were made using learned associations, and so forth.

At 704, the authentication profile service determines correlations between network contexts based on the authentication data received from the plurality of mobile stations. Correlations include, in various embodiments, correlations between sensor data to infer physical locations (such as by inferring location from the presence of out-of-band wireless networks) Correlations include determining relative probabilities that learned associations between network contextual information and authentication credentials, and/or different portions of network contextual data may, if in agreement with the network contextual data of a visited network, result in a successful roving attempt. The correlations may include correlations between disparate physical locations and one or more network associations, such as corresponding to a large organization, such as a retailer, employer, educational association (e.g., locations associated with a university and/or associations of universities or colleges), and so forth.

At 706, the authentication profile service may receive information related to a learned association, such as information related to a learned roving authentication profile, from a particular mobile station. The information may include the network contextual information associated with authentication credentials, such as network association information, location information, light and image data, audio data, accelerometer data, and so forth.

At 708, the authentication profile service determines and provides to the mobile station modifications to be made to the learned association information. Such modifications may be based, in some embodiments, on the correlations determined by the authentication profile service from the plurality of mobile stations as described above. The modifications may include promotion or demotion of association information, such as promotion or demotion of a learned roving authentication profile, portions of a learned roving authentication profile, and so forth. The modifications may include priority information, deletions or de-associations of learned roving authentication profiles or portions of learned roving authentication profiles, additions of learned roving authentication profiles or portions of learned roving authentication profiles, and so forth. Additions may include additional network associations, location information, as well as other information.

At 710, the authentication profile service receives roving network contextual information from a mobile station, such as at a time that the mobile station has entered a geographic area covered by an access point of a visited network. The roving network contextual information includes, in various embodiments, one or more of the network contextual information associated with the visited network, as well as network contextual information associated with authentication credentials on the mobile station (e.g., network contextual information stored in a learned roving authentication profile).

At 712, the authentication profile service determines whether there is agreement, match, association, correspondence, correlation, and/or overlap between network contextual information in a learned authentication profile having other authentication credentials (e.g., associated with network contextual information in a learned roving authentication profile), and second network contextual information associated with the mobile device. Determining whether there is agreement includes in some embodiments attempting to match network association information, such as HESSID, domain names, roaming consortium OIs, cellular providers, and types of network association advertised by the second network with the same or similar type of information associated with authentication credentials (e.g., in a learned roving authentication profile). In some embodiments, an agreement between the first network contextual information and the second network contextual information may be determined based on a lack of correlation. In other words, the first network contextual information associated with the authentication credentials may be "negative" contextual information that indicates network contextual information from networks for which the authentication credentials were not successful in one or more connection attempts. Thus, in these embodiments, the authentication profile service causes the mobile device to attempt to connect to the network when the first network contextual information does not match the second contextual information. As used herein, an "agreement" between the first network contextual information and the second network contextual information" includes both a match and partial match, as well as a complete lack of a match, such as where such "negative" contextual information is associated with the authentication credentials.

At 714, the authentication profile service provides to the mobile station an identification of the authentication credentials to use to attempt to rove to the visited network. The identification of the authentication credentials may include, in various embodiments, providing the authentication credentials to the mobile station, identifying a learned roving authentication profile, or some other identifying information. The mobile station may utilize this information to determine which credentials to select to attempt to rove to the wireless network, although the mobile station may override the selection based on various factors.

Figure 8:
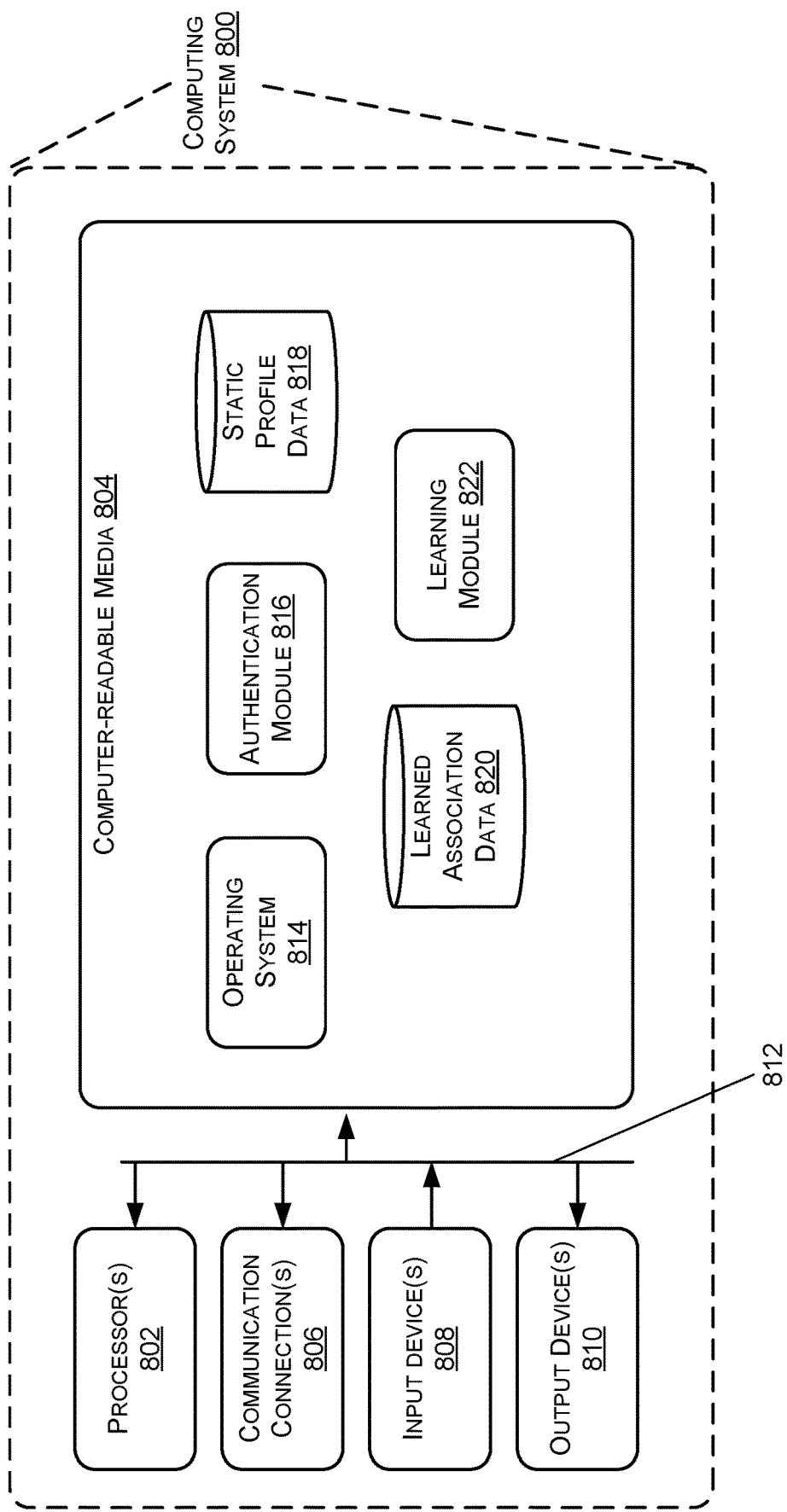
FIG. 8 is a block diagram of an example computing system usable to implement a mobile station according to various embodiments of the present disclosure.

FIG. 8 is a block diagram of an example computing system 800 usable to implement a mobile station (such as the mobile station 102) according to various embodiments of the present disclosure. According to various non-limiting examples, the computing system 800 includes one or more computing devices, such as desktop computers, laptop computers, mobile phones, tablet computers, media players, game consoles, electronic book reader devices, personal data assistants, or other hardware devices. In one example configuration, the computing system 800 comprises at least one processor 802. The computing system 800 also contains communication connection(s) 806 that allow communications with various other systems. The computing system 800 also includes one or more input devices 808, such as a keyboard, mouse, pen, voice input device, touch input device, etc., and one or more output devices 810, such as a display (including a touch-screen display), speakers, printer, etc. coupled communicatively to the processor(s) 802 and the computer-readable media 804 via bus 812

The computer-readable media 804 stores computer-executable instructions that are loadable and executable on the processor(s) 802, as well as data generated during execution of, and/or usable in conjunction with, these programs. In the illustrated example, computer-readable media 804 stores an operating system 814, which provides basic system functionality of the computing system 800 and, among other things, provides for operation of the other programs and modules of the computing system 800.

An authentication module 816 is executable to control the communication connections 806 to authenticate and rove onto wireless networks, such as visited networks. The authentication module 816 queries the wireless networks for capability information—such as by using ANQP or other— and determines whether one or more static authentication profiles, such as static authentication profiles associated with the network, or one or more static roving authentication profiles associated with network associations advertised by the network, are stored within static profile data 818. Where no such static authentication profiles are available—or where authentication attempts using them are unsuccessful—the authentication module 816 determines whether to attempt to rove to the network using any authentication credentials in a learned authentication profile, such as a learned roving authentication profile, stored in learned association data 820. The authentication module 816 controls the communication connections 806 to attempt to authenticate and rove to the network using such learned authentication profile credentials as described in more detail elsewhere within this Detailed Description.

A learning module 822 associates authentication credentials with network contextual information based at least on a concurrence of a successful authentication to a network using the authentication credentials and the corresponding network contextual information associated with the network, including the network association data, location information, other sensor data, and so forth. The learning module 822 also updates and modifies the learned association data 820 (e.g., the learned roving authentication profiles) based at least successful attempts to use the authentication credentials, and based on input from an authentication profile service (such as the authentication profile service 202). The learning module 822 may query the authentication profile service for modifications to the learned association data 820, and receive replies to the query including data indicating modifications to be made to the learned association data 820.

Figure 9:
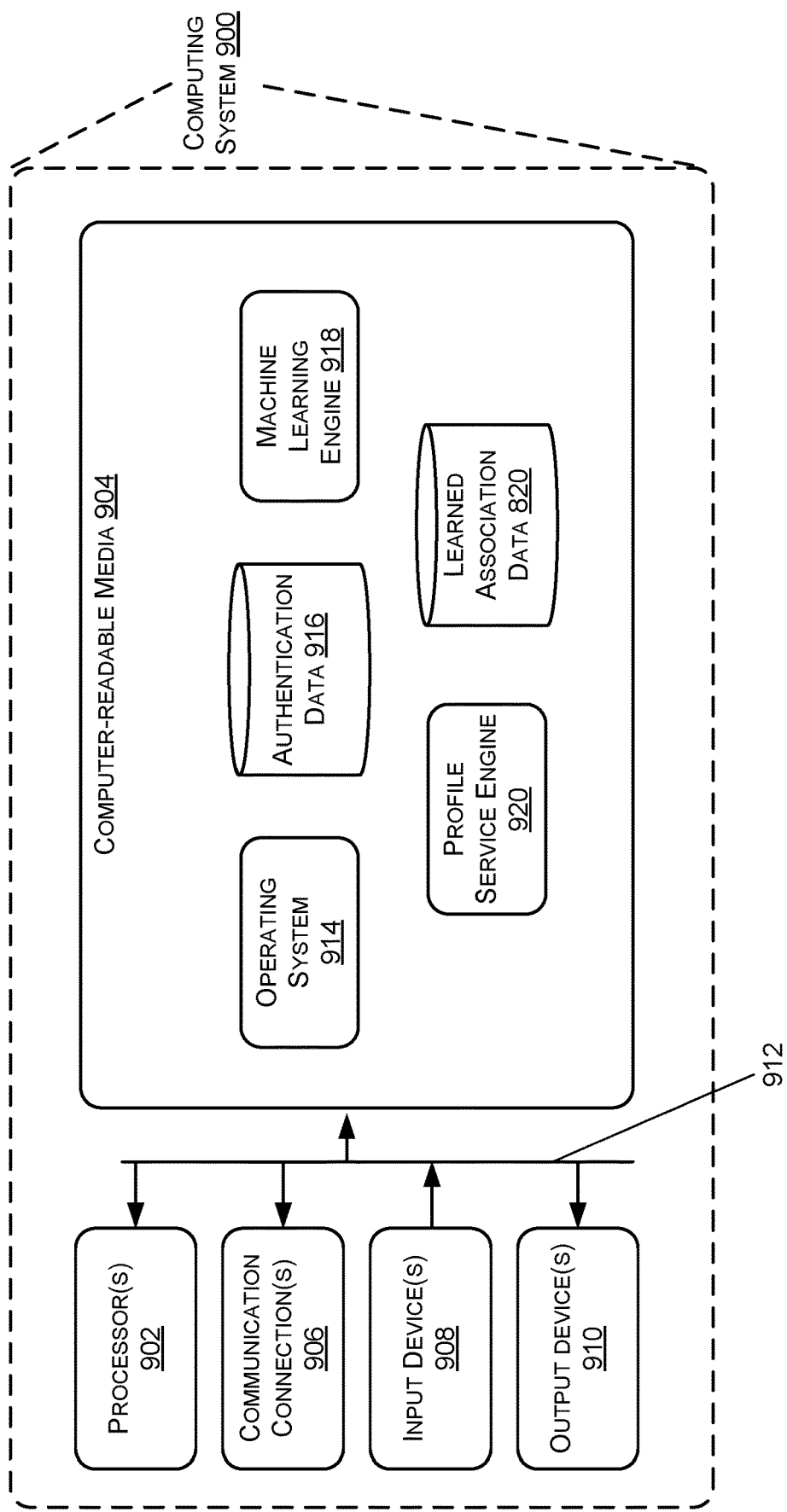
FIG. 9 is a block diagram of an example computing system usable to implement an authentication profile service according to various embodiments of the present disclosure.

FIG. 9 is a block diagram of an example computing system 900 usable to implement an authentication profile service (such as the authentication profile service 202) according to various embodiments of the present disclosure. According to various non-limiting examples, the computing system 900 includes one or more computing devices, such as desktop computers, servers, cloud-based servers, or other hardware devices. In one example configuration, the computing system 900 comprises at least one processor 902. The computing system 900 can also contain communication connection(s) 906 that allow communications with various other systems. The computing system 900 can also include one or more input devices 908, such as a keyboard, mouse, pen, voice input device, touch input device, etc., and one or more output devices 910, such as a display (including a touch-screen display), speakers, printer, etc. coupled communicatively to the processor(s) 902 and the computer-readable media 904 via bus 912.

The computer-readable media 904 stores computer-executable instructions that are loadable and executable on the processor(s) 902, as well as data generated during execution of, and/or usable in conjunction with, these programs. In the illustrated example, computer-readable media 804 stores an operating system 914, which provides basic system functionality of the computing system 900 and, among other things, provides for operation of the other programs and modules of the computing system 900.

Authentication data 916 from a plurality of mobile stations are stored in the computer-readable media 904. The authentication data 916 includes, among other things, learned associations between authentication credentials and network contextual information, data regarding success and failure of roving attempts using learned associations, network context data of visited networks for which authentication and roving attempts were made using learned associations, and so forth.

A machine learning engine 918 determines correlations between network contexts based on the authentication. Correlations include, in various embodiments, correlations between sensor data to infer physical locations (such as by inferring location from the presence of out-of-band wireless networks). Correlations include determining relative probabilities that learned association between network contextual information and authentication credentials, and/or different portions of network contextual data may, if in agreement with the network contextual data of a visited network, result in successful roving attempt. The correlations may include correlations between disparate physical locations and one or more network associations, such as corresponds to a large organization, such as a retailer, employer, educational association (e.g., locations associated with a university and/or associations of universities or colleges), and so forth.

A profile service engine 920 provides, to mobile stations—such as the mobile station 102—modifications to be made to learned associations (e.g., learned roving authentication profiles), such as priority modifications, deletions and/or de-associations of profiles or portions of profiles, additions or promotions to certain profiles or portions of profiles, and so forth, such as is described in more detail elsewhere within this Detailed Description. The profile service engine 920 is also executable to receive from a mobile station network contextual data associated with a network, and to provide information to the mobile station indicating authentication credentials to be used to attempt to rove to the network, such as is described in more detail elsewhere within this Detailed Description. To facilitate such determination, the computing system 900 may store the learned association data 820 in order to determine the match or agreement between learned associations of the mobile station and the network contextual data of the visited network.

Processor(s) 802 and 902 may be or include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative embodiments one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, embodiments of the computing system 800 may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs). In some examples, wireless networking and network capability querying may be performed using a first processing unit having an FPGA, ASIC, or DSP, and learned roving authentication profile creation and modification may be performed using a second processing unit having a CPU based on stored programming instructions. This is an example only and other examples and combinations are possible without departing from the scope of embodiments.

Depending on the configuration and type of computing device used, computer-readable media 804 and 904 include volatile memory (such as random access memory (RAM)) and/or non-volatile memory (such as read-only memory (ROM), flash memory, etc.). The computer-readable media 804 and 904 can also include additional removable storage and/or non-removable storage including, but not limited to, SSD (e.g., flash memory), HDD storage or other type of magnetic storage, optical storage, and/or tape storage that can provide non-volatile storage of computer-executable instructions, data structures, program modules, and other data for computing systems 800 and 900.

Computer-readable media 804 and 904 can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

FIGS. 5-7 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Example Clauses

Clause A: A method comprising determining that a client device lacks access to authentication credentials that are indicated as definitely usable to authenticate to a visited network; determining that first contextual information associated with other authentication credentials available to the client device at least partly corresponds to second contextual information associated with the visited network; and sending, based at least in part on the determining that the first contextual information at least partly corresponds to the second contextual information, a request to the visited network to authenticate using the other authentication credentials.

Clause B: The method of clause A, wherein the first contextual information is also associated with another network, the method further comprising associating, based at least on a successful authentication to the other network using the other authentication credentials, the other authentication credentials with the first contextual information.

Clause C: The method of clause A or B, further comprising providing at least the first contextual information to a profile service; and receiving from the profile service information regarding modifications to be made to the first contextual information.

Clause D: The method of clause C, wherein the modifications correspond to at least one of priority information usable to prioritize the other authentication credentials; de-associating the other authentication credentials from one or more portions of the first contextual information; and associating the other authentication credentials with additional contextual information.

Clause E: The method of any of clauses A-D, wherein the first contextual information and the second contextual information both include one or more of a homogeneous extended service set identifier (HESSID), a roaming consortium organization identifier (OI), a domain name, a network address identifier (NAI) realm list, cellular information, and an access network query protocol (ANQP) vendor-specific list.

Clause F: The method of any of clauses A-E, wherein the first contextual information includes first physical location information associated with another network for which the other authentication credentials are indicated as usable to authenticate, and the second contextual information includes second physical location information associated with the visited network.

Clause G: The method of any of clauses A-F, further comprising modifying an association between the first contextual information and the other authentication credentials based at least on whether an attempt to authenticate to the visited network using the other authentication credentials is successful.

Clause H: The method of any of clauses A-G, further comprising determining that authenticating to the visited network using the other authentication credentials is successful; and updating the other authentication credentials based in part on one or more portions of the first contextual information that do not match the second contextual information.

Clause I: The method of any of clauses A-E, further comprising determining that authenticating to the visited network using the other authentication credentials is unsuccessful; and updating the other authentication credentials based in part on one or more portions of the first contextual information that match the second contextual information.

Clause J: The method of any of clauses A-I, wherein the other authentication credentials are first authentication credentials, and the method further comprises determining that a plurality of authentication credentials, including the first authentication credentials, are associated with contextual information that at least partially matches the second contextual information associated with the visited network; and prioritizing the plurality of authentication credentials for authenticating to the visited network based at least on one or more of degrees of similarity between the contextual information associated with the plurality of authentication credentials and the second contextual information of the visited network; specificity of the contextual information associated with of the plurality of authentication credentials; and information regarding previous attempts to authenticate using individual ones of the plurality of authentication credentials.

Clause K: A client device, comprising one or more processors; memory; and one or more program modules stored on the memory and executable by the one or more processors, the one or more program modules configured to detect a visited network, wherein the client device lacks access to available authentication credentials indicated as definitely usable to authenticate to the visited network; determine that there is at least partial agreement between first contextual information associated with other authentication credentials and second contextual information associated with the visited network; and attempt, based at least on the determining, to authenticate to the visited network using the other authentication credentials.

Clause L: The client device of clause K, wherein the first contextual information corresponds to another network, and the acts further comprise associating the other authentication credentials with the first contextual information based at least partly on a successful authentication to the other network using the other authentication credentials.

Clause M: The client device of clause K or L, wherein the first contextual information includes first network association information that indicates one or more other networks for which authentication credentials are usable to rove to the other network, and the acts further comprise sending the authentication request to the visited network based at least on the second contextual information of the visited network including second network association information that at least partly overlaps with the first network association information.

Clause N: The client device of any of clauses K-M, wherein the first contextual information includes first physical location information corresponding to another network for which the other authentication credentials are usable to authenticate, the second contextual information includes second physical location information corresponding to the visited network, and the acts further comprise determining that there is at least partial agreement between the first contextual information and the second contextual information based at least in part on the first physical location information being associated with the second physical location information.

Clause O: The client device of any of clauses K-N, wherein the one or more program modules are further configured to transmit to a profile service the first contextual information; and receive from the profile service priority information to be used to prioritize the other authentication credentials from amongst a plurality of authentication credentials for authenticating to the visited network.

Clause P: The client device of any of clauses K-O, wherein the acts further comprise, based at least in part on the other authentication credentials having been successfully used to rove to one or more networks a predetermined number of times due to an association between the other authentication credentials and the first contextual information, preventing further modification of the association between the other authentication credentials and the first contextual information.

Clause Q: A method comprising determining that there is at least partial agreement between first contextual information associated with a mobile device and second contextual information associated with a network; and providing, by a profile service, based at least in part on there being at least partial agreement between the first contextual information and the second contextual information, the mobile device with authentication credentials for the network.

Clause R: The method of clause Q, further comprising receiving the first contextual information from the mobile device.

Clause S: The method of clause Q or R, further comprising, based at least in part on successful authentication by the mobile device to the network using the authentication credentials, de-associating the authentication credentials from one or more portions of the first contextual information that do not correspond to the second contextual information.

Clause T: The method of clause Q or R, further comprising based at least on successful authentication to the network by the mobile device, adjusting a priority metric associated with the first contextual information, the priority metric usable to determine whether to cause the mobile device to attempt to authenticate to a third network based at least in part on the third network being associated with third contextual information that at least partly agrees with the first contextual information.

Clause U: A system comprising one or more processors; memory; and one or more program modules stored on the memory and executable by the one or more processors, the one or more program modules configured to determine that there is at least partial agreement between first contextual information associated with a mobile device and second contextual information associated with a network; and provide, based at least in part on there being at least partial agreement between the first contextual information and the second contextual information, the mobile device with authentication credentials for the network.

Clause V: The system of clause U, the one or more program modules configured to receive the first contextual information from the mobile device.

Clause W: The system of clause U or V, the one or more program modules configured to, based at least in part on successful authentication by the mobile device to the network using the authentication credentials, de-associate the authentication credentials from one or more portions of the first contextual information that do not correspond to the second contextual information.

Clause X: The system of clause U or V, the one or more program modules configured to, based at least on successful authentication to the network by the mobile device, adjust a priority metric associated with the first contextual information, the priority metric usable to determine whether to cause the mobile device to attempt to authenticate to a third network based at least in part on the third network being associated with third contextual information that at least partly agrees with the first contextual information.

Clause Y: A client device comprising means for determining that the client device lacks access to authentication credentials that are indicated as definitely usable to authenticate to a visited network; means for determining that first contextual information associated with other authentication credentials available to the client device at least partly agrees with second contextual information associated with the visited network; and means for sending, based at least in part on the determining that the first contextual information at least partly agrees with the second contextual information, a request to the visited network to authenticate using the other authentication credentials.

Clause Z: The client device of clause Y, wherein the first contextual information is also associated with another network, the computing device further comprising means for associating, based at least on a successful authentication to the other network using the other authentication credentials, the other authentication credentials with the first contextual information.

Clause AA: The client device of clause Y or Z, further comprising means for providing at least the first contextual information to a profile service; and means for receiving from the profile service information regarding modifications to be made to the first contextual information.

Clause AB: The client device of clause AA, wherein the modifications correspond to at least one of priority information usable to prioritize the other authentication credentials; de-associating the other authentication credentials from one or more portions of the first contextual information; and associating the other authentication credentials with additional contextual information.

Clause AC: The client device of any of clauses Y-AB, wherein the first contextual information and the second contextual information both include one or more of a homogeneous extended service set identifier (HESSID), a roaming consortium organization identifier (OI), a domain name, a network address identifier (NAI) realm list, cellular information, and an access network query protocol (ANQP) vendor-specific list.

Clause AD: The client device of any of clauses Y-AC, wherein the first contextual information includes first physical location information associated with another network for which the other authentication credentials are indicated as usable to authenticate, and the second contextual information includes second physical location information associated with the visited network.

Clause AE: The client device of any of clauses Y-AD, further comprising means for modifying an association between the first contextual information and the other authentication credentials based at least on whether an attempt to authenticate to the visited network using the other authentication credentials is successful.

Clause AF: The client device of any of clauses Y-AE, further comprising means for determining that authenticating to the visited network using the other authentication credentials is successful; and means for updating the other authentication credentials based in part on one or more portions of the first contextual information that do not match the second contextual information.

Clause AG: The client device of any of clauses Y-AD, further comprising means for determining that authenticating to the visited network using the other authentication credentials is unsuccessful; and means for updating the other authentication credentials based in part on one or more portions of the first contextual information that match the second contextual information.

Clause AH: The client device of any of clauses Y-AG, wherein the other authentication credentials are first authentication credentials, and the computing device further comprises means for determining that a plurality of authentication credentials, including the first authentication credentials, are associated with contextual information that at least partially matches the second contextual information associated with the visited network; and means for prioritizing the plurality of authentication credentials for authenticating to the visited network based at least on one or more of: degrees of similarity between the contextual information associated with the plurality of authentication credentials and the second contextual information of the visited network; specificity of the contextual information associated with of the plurality of authentication credentials; and information regarding previous attempts to authenticate using individual ones of the plurality of authentication credentials.

Clause AI: The client device of any of clauses Y-AG, wherein the computing device includes means for implementing a brute force authentication method and the first contextual information includes negative contextual information.

CONCLUSION

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   determining that a client device lacks access to authentication credentials that are indicated as definitely usable to authenticate to a visited network;
   determining that first contextual information associated with other authentication credentials available to the client device at least partly corresponds to second contextual information associated with the visited network;
   sending, based at least in part on the determining that the first contextual information at least partly corresponds to the second contextual information, a request to the visited network to authenticate using the other authentication credentials; and
   modifying an association between the first contextual information and the other authentication credentials based at least on whether authenticating to the visited network using the other authentication credentials is successful.

2. The method of claim 1, wherein the first contextual information is also associated with another network, the method further comprising associating, based at least on a successful authentication to the other network using the other authentication credentials, the other authentication credentials with the first contextual information.

3. The method of claim 1, further comprising:
   providing at least the first contextual information to a profile service; and
   receiving from the profile service information regarding modifications to be made to the first contextual information.

4. The method of claim 3, wherein the modifications correspond to at least one of:
   priority information usable to prioritize the other authentication credentials;
   de-associating the other authentication credentials from one or more portions of the first contextual information; and
   associating the other authentication credentials with additional contextual information.

5. The method of claim 1, wherein the first contextual information and the second contextual information both include one or more of a homogeneous extended service set identifier (HESSID), a roaming consortium organization identifier (OI), a domain name, a network address identifier (NAI) realm list, and an access network query protocol (ANQP) vendor-specific list.

6. The method of claim 1, wherein the first contextual information includes first physical location information associated with another network for which the other authentication credentials are indicated as usable to authenticate, and the second contextual information includes second physical location information associated with the visited network.

7. The method of claim 1, further comprising:
   determining that authenticating to the visited network using the other authentication credentials is successful; and
   updating the other authentication credentials based in part on one or more portions of the first contextual information that do not match the second contextual information.

8. The method of claim 1, further comprising:
   determining that authenticating to the visited network using the other authentication credentials is unsuccessful; and
   updating the other authentication credentials based in part on one or more portions of the first contextual information that match the second contextual information.

9. The method of claim 1, wherein the other authentication credentials are first authentication credentials, and the method further comprises:
   determining that a plurality of authentication credentials, including the first authentication credentials, are associated with contextual information that at least partially matches the second contextual information associated with the visited network; and prioritizing the plurality of authentication credentials for authenticating to the visited network based at least on one or more of:
degrees of similarity between the contextual information associated with the plurality of authentication credentials and the second contextual information of the visited network;
specificity of the contextual information associated with the plurality of authentication credentials; and
information regarding previous attempts to authenticate using individual ones of the plurality of authentication credentials.

10. A client device, comprising:
one or more processors;
memory; and
one or more program modules stored on the memory and executable by the one or more processors, the one or more program modules configured to:
    detect a visited network, wherein the client device lacks access to available authentication credentials indicated as definitely usable to authenticate to the visited network;
    determine that there is at least partial agreement between first contextual information associated with other authentication credentials and second contextual information associated with the visited network;
    transmit, to a profile service, the first contextual information;
    receive, from the profile service, priority information to be used to prioritize the other authentication credentials from amongst a plurality of authentication credentials for authenticating to the visited network; and
    attempt, based at least on the determining and the priority information, to authenticate to the visited network using the other authentication credentials.

11. The client device of claim 10, wherein the first contextual information corresponds to another network, and the acts further comprise associating the other authentication credentials with the first contextual information based at least partly on a successful authentication to the other network using the other authentication credentials.

12. The client device of claim 11, wherein the first contextual information includes first network association information that indicates the other authentication credentials are usable to rove to the other network, and the one or more program modules are further configured to send an authentication request to the visited network based at least on the second contextual information of the visited network including second network association information that at least partly overlaps with the first network association information.

13. The client device of claim 10, wherein the first contextual information includes first physical location information corresponding to another network for which the other authentication credentials are usable to authenticate, the second contextual information includes second physical location information corresponding to the visited network, and the acts further comprise determining that there is at least partial agreement between the first contextual information and the second contextual information based at least in part on the first physical location information being associated with the second physical location information.

14. The client device of claim 10, wherein the one or more program modules are further configured to, based at least in part on the other authentication credentials having been successfully used to rove to one or more networks a predetermined number of times due to an association between the other authentication credentials and the first contextual information, prevent further modification of the association between the other authentication credentials and the first contextual information.

15. A method comprising:
determining that there is at least partial agreement between first contextual information associated with a mobile device and second contextual information associated with a network;
providing, by a profile service, based at least in part on the at least partial agreement between the first contextual information and the second contextual information, the mobile device with authentication credentials for the network; and
based at least on successful authentication to the network by the mobile device, adjusting a priority metric associated with the first contextual information, the priority metric usable to determine whether to cause the mobile device to attempt to authenticate to another network based at least in part on the other network being associated with third contextual information that at least partly agrees with the first contextual information.

16. The method of claim 15, further comprising receiving the first contextual information from the mobile device.

17. The method of claim 15, further comprising, based at least in part on the successful authentication to the network by the mobile device using the authentication credentials, de-associating the authentication credentials from one or more portions of the first contextual information that do not correspond to the second contextual information.

* * * * *